United States Patent
Holy et al.

[15] 3,646,419
[45] Feb. 29, 1972

[54] NUMERICAL CONTROL WITH POSITION OFFSET

[72] Inventors: Josef K. Holy, Torrance; Esteban J. Toscano, Tarzana, both of Calif.

[73] Assignee: Hughes Aircraft Company, Culver City, Calif.

[22] Filed: Nov. 5, 1969

[21] Appl. No.: 874,165

[52] U.S. Cl............................318/603, 318/572, 235/151.11
[51] Int. Cl.......................................................G05b 19/28
[58] Field of Search........................318/603, 572; 235/151.11

[56] References Cited

UNITED STATES PATENTS

| | | | |
|---|---|---|---|
| 3,492,467 | 1/1970 | Caban et al. | 318/603 X |
| 3,566,239 | 2/1971 | Taniguchi | 318/603 X |
| 3,218,532 | 11/1965 | Toscano | 318/572 |
| 3,270,186 | 8/1966 | Centner | 318/572 X |
| 3,340,447 | 9/1967 | MacDonald | 318/572 X |

Primary Examiner—Benjamin Dobeck
Attorney—James K. Haskell and E. F. Oberheim

[57] ABSTRACT

A record-controlled incremental positioning system for providing position offset without the need for returning the element being positioned to a zero point in a positioning axis. Desired position information is stored in a desired position count register. Overshoot movement is stored in an overshoot count register. The magnitude of the count of a preceding overshoot movement is combined, with the sign reversed, with a succeeding count of desired position in the desired position count register. Position offset is stored in manually set switches. Storage facilities independently of the switches are provided for information identifying switches individually having both the old position offset and the new or succeeding position offset which, under the control of an initiating signal from the tape, are transferred in sequence from the storage facilities to the overshoot count register and from the overshoot count register to the position count register, the old position offset count with the same sign and the new position offset with the sign reversed.

4 Claims, 20 Drawing Figures

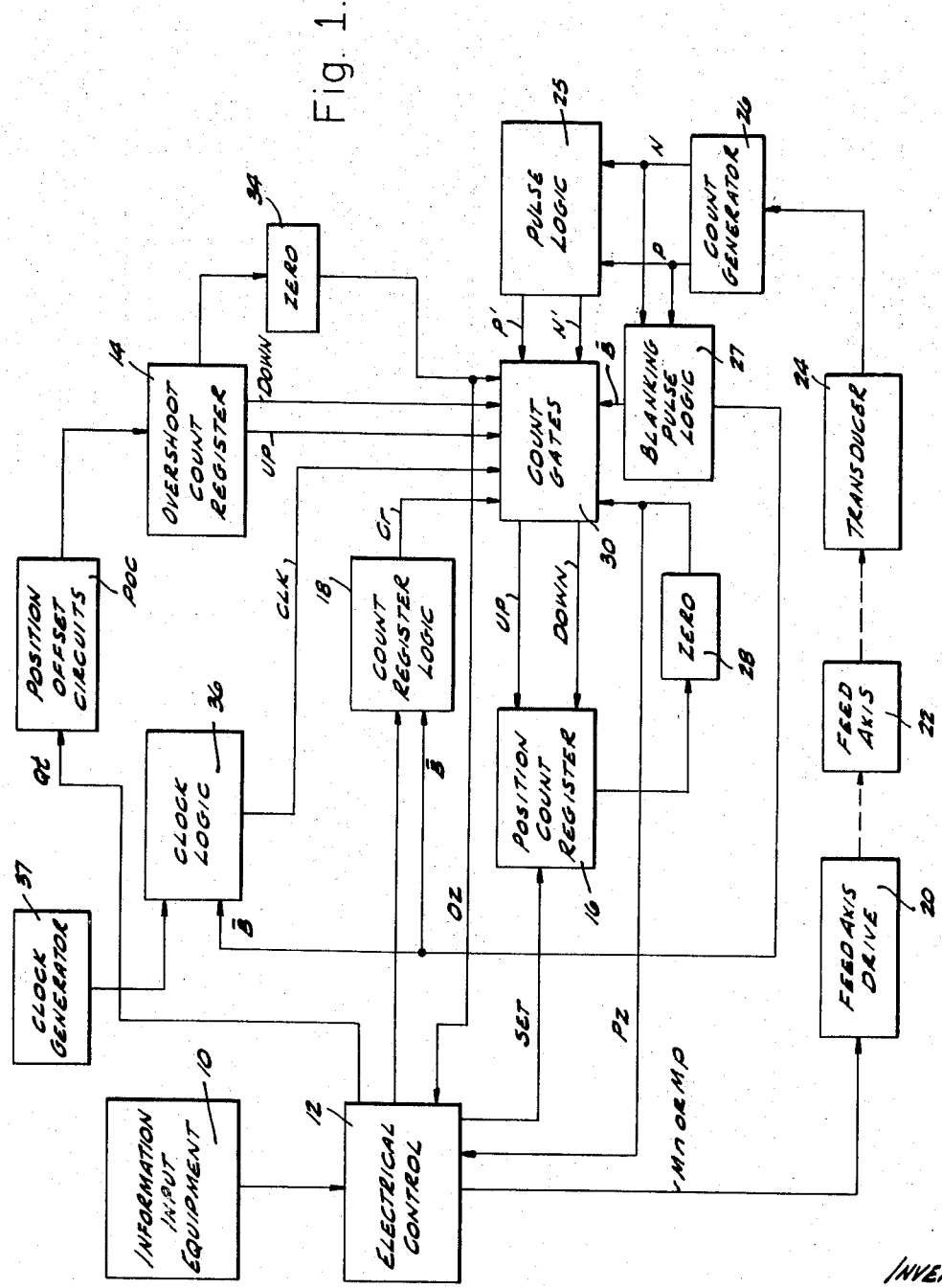

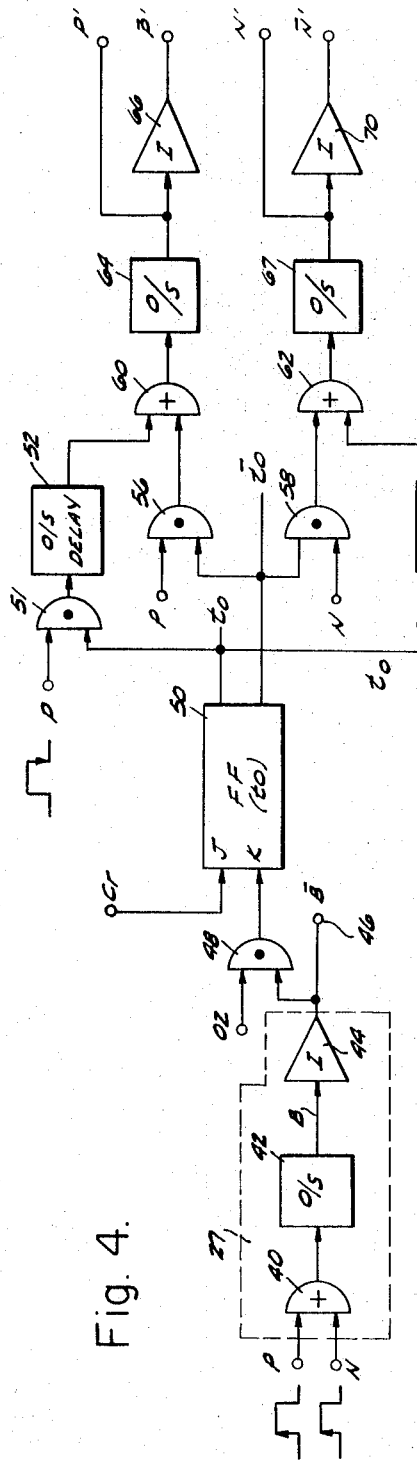
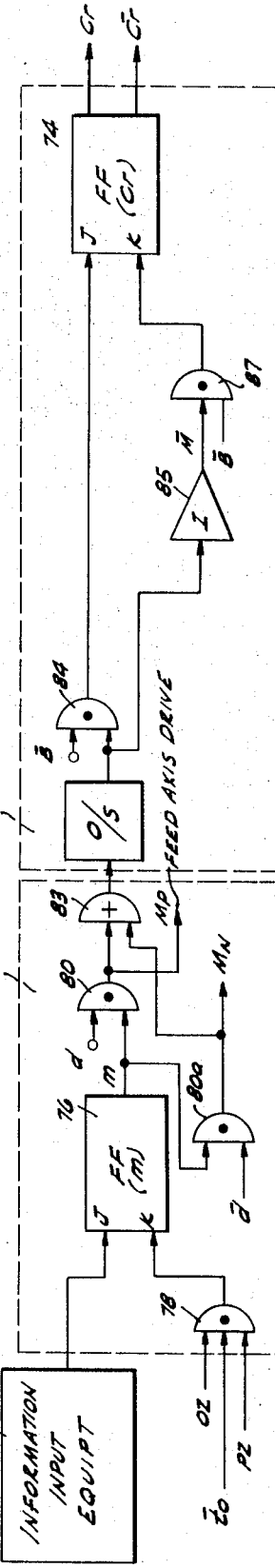
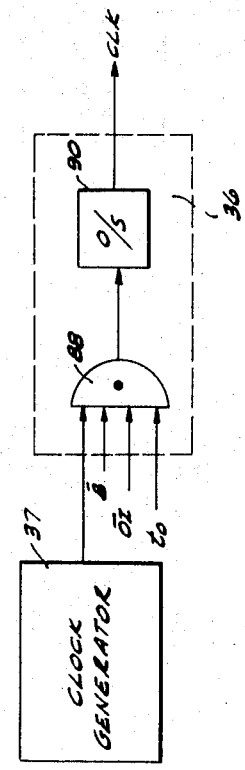
Fig. 4.
Fig. 5.
Fig. 6.

PART OF COUNT GATES 30 OF FIG. 1. PART OF POSITION COUNT GATE 18a OF FIG. 3.

PART OF COUNT GATES 30 OF FIG. 1.
PART OF POSITION COUNT GATE 18a. OF FIG. 3.

PART OF OVERSHOOT COUNT GATE 32
FIG. 3. - PART OF COUNT GATES 30 - FIG. 1.

PART OF OVERSHOOT COUNTER GATE 32 - FIG. 3.
PART OF COUNT GATES 30 - FIG. 1.

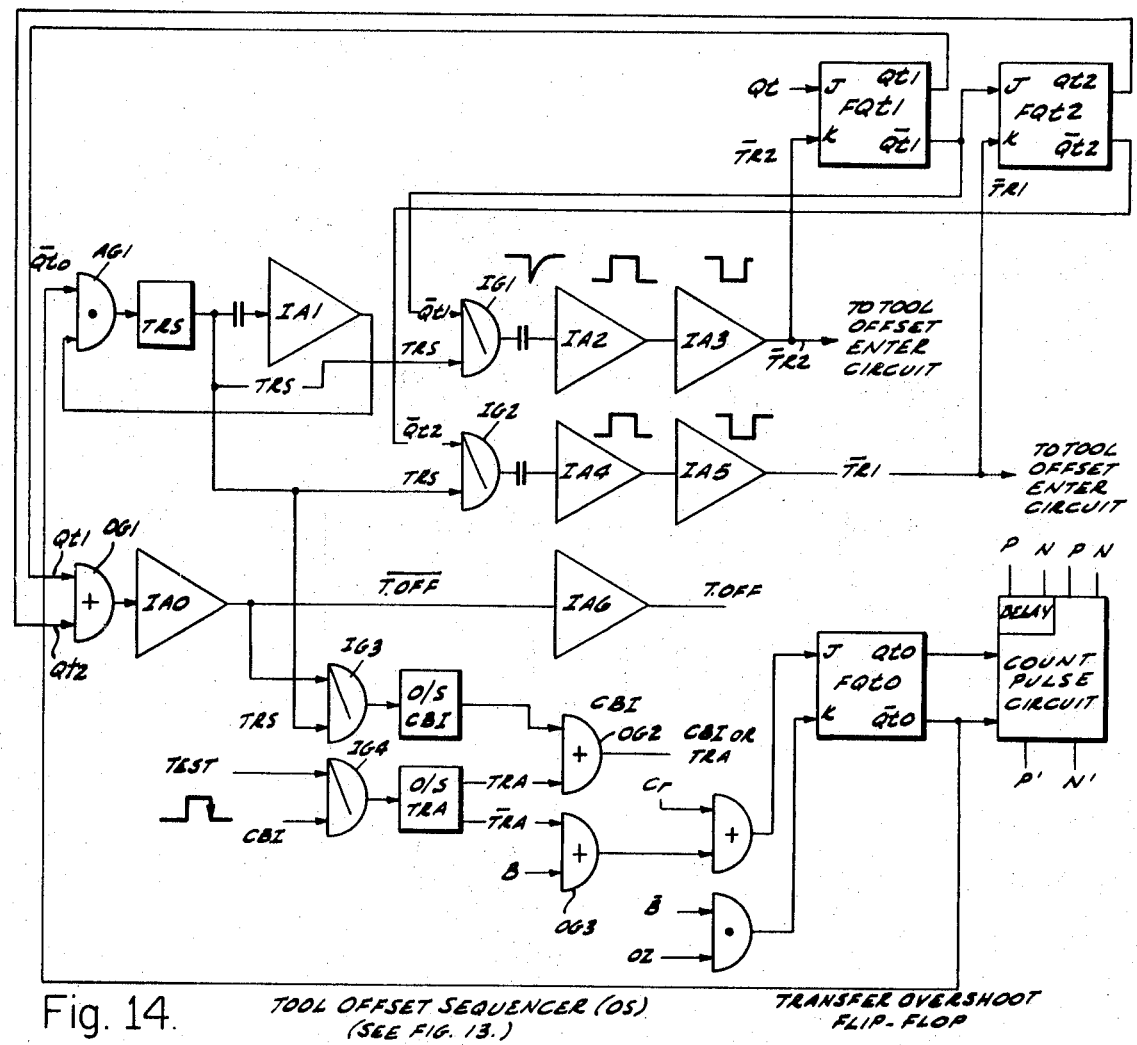
Fig. 14. TOOL OFFSET SEQUENCER (OS) (SEE FIG. 13.)   TRANSFER OVERSHOOT FLIP-FLOP
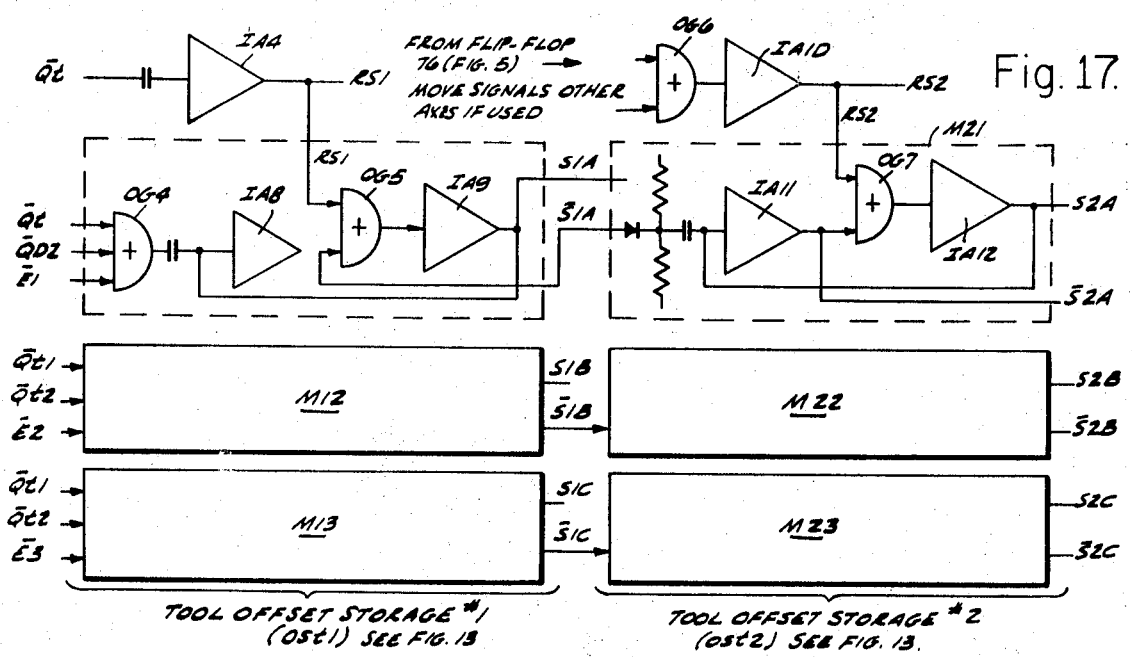
Fig. 17.
TOOL OFFSET STORAGE #1 (OST1) SEE FIG. 13.   TOOL OFFSET STORAGE #2 (OST2) SEE FIG. 13.

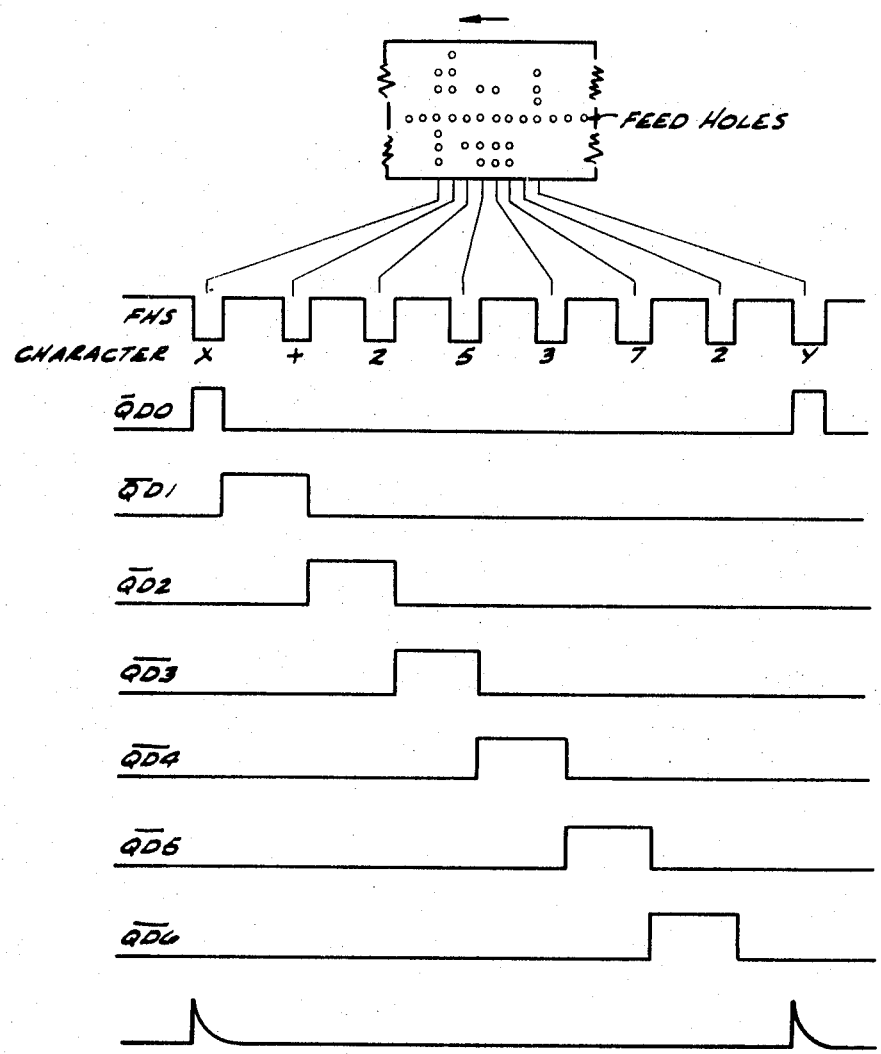
Fig. 15.   DISTRIBUTION COUNTER TIMING
SEE PATENT 3252147
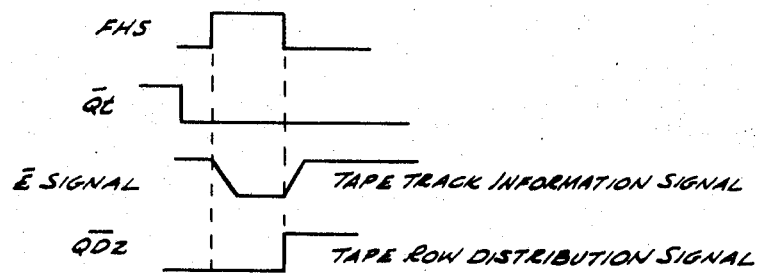
Fig. 16.

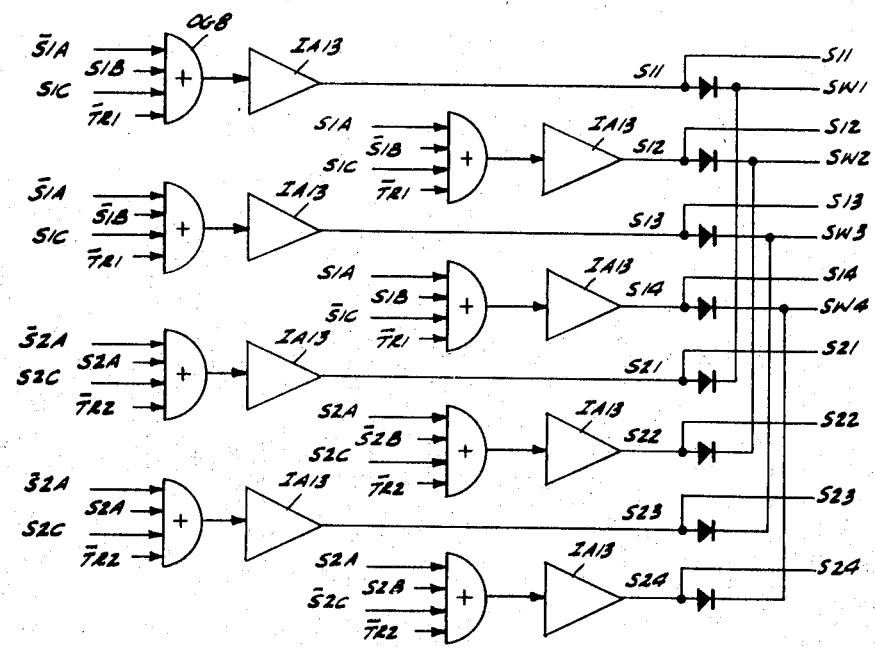
Fig. 18.  TOOL OFFSET ENTER CIRCUITS (OE)
(SEE FIG. 13)
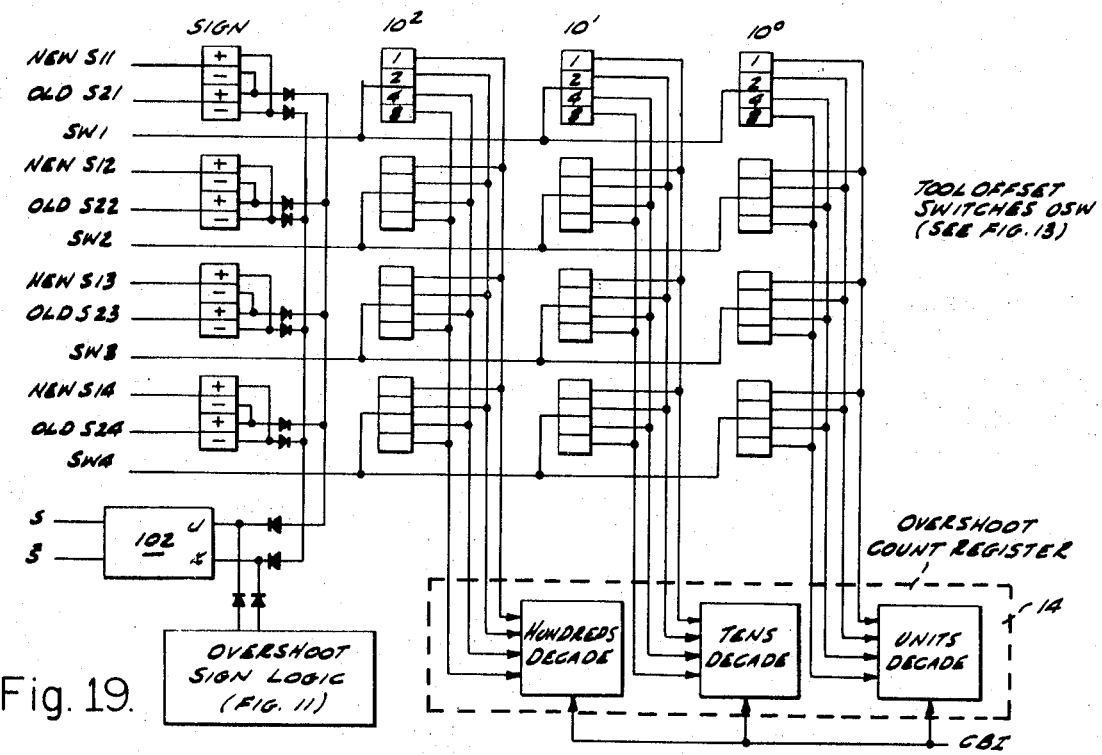
Fig. 19.

NUMERICAL CONTROL WITH POSITION OFFSET

CROSS-REFERENCES TO RELATED APPLICATIONS

This application relates to application Ser. No. 868,963, filed Oct. 1, 1969, entitled ELECTRICAL CONTROL SYSTEM, which is a continuation of application Ser. No. 597,624, filed Nov. 29, 1966, entitled ELECTRICAL CONTROL SYSTEM, inventors Raymond C. Bell, Josef K. Holy, John W. Tarbox and Esteban J. Toscano, and assigned to the assignee of this invention.

BACKGROUND OF THE INVENTION

This invention relates generally to numerical control systems and more particularly to a novel and improved numerical control system having provisions for introducing position offset without the need for the return of the element being positioned to a zero point or limit of movement in the axis.

U.S. Pat. No. 3,414,718 to M. R. McElroy for a COUNTING CIRCUIT, assigned to the assignee of this invention, describes a numerical control arrangement having a counter in which provision is made for noting a count of limited overshoot movement in an overshoot counter and using this count to correct the count of desired position.

Arrangements of this type are useful in incremental positioning systems in which movement in a particular direction in an axis is controlled by an indication of magnitude of the movement which is stored on a record of some sort, for example, a punched paper tape. Succeeding increments of movement are ordinarily programmed from the position at which the movable element was left at the end of the preceding positioning movement. If position offset is used in a system of this type the position offset can only be erased or its effect removed by returning the movable element to a zero position and programming the next movement from the zero position whether the zero position be an actual mechanical limit in the axis or some selected zero position.

To expedite positioning movement it is desirable that in an incremental positioning system the succeeding movements may be programmed directly from the end of the preceding programmed movement. This means that the movable element must be precisely in the programmed position or its count of new desired position having been compensated for both overshoot movement and any position offset which may have been introduced in connection with the preceding movement.

SUMMARY OF THE INVENTION

Accordingly, this invention is directed to that improvement in such numerical control systems which affords automatic position offset compensation so that programming of increments of desired position may be made from any last programmed position of the movable element in the axis.

This is accomplished utilizing a numerical control system of the type employed for compensating overshoot in the axis as described in the copending application of R. C. Bell et al. aforesaid. The arrangement of Bell et al. incorporates a desired position count register in which a desired position of the movable element in the axis is programmed by means of a fixed record, such as a punched paper tape, for example. The patent to Bell is directed to an arrangement for compensating overshoot of the desired position by the movable element in the axis in a system wherein the count of overshoot movement is stored in an overshoot count register. When a succeeding or following desired position is programmed in the axis and transferred into the desired position count register, whether or not this new position is zero or some fixed number position, upon the initiation of the succeeding desired position movement the magnitude of the count of the overshoot counter is transferred automatically to the desired position count register with its sign reversed, so that if the new desired position is in the same direction as the direction of overshoot movement the magnitude of the overshoot count is subtracted from the new desired position, since the part is already part way to the new desired position as a result of the overshoot movement. If the direction of movement to the new desired position is the reverse of that which resulted from overshoot movement then, of course, the magnitude of the count of overshoot movement must be added to the count of new desired position if the movable element is to reach the new desired position as programmed. Thus, the magnitude of the overshoot count is always combined in the desired position register with the sign reversed from that of the actual direction of overshoot. In such an arrangement the sign of the direction of movement of desired position is always noted, as well as the sign of the direction of overshoot movement, so that both the desired position count register and the overshoot count register may be properly controlled.

To permit writing fixed programs which may be punched out in tape or recorded on some suitable recording medium it is desired that any position offset be indicated separately. Such separate indication may take different forms. A presently preferred form is that provided by manually set switches, such as dial operated switches, which may be operated by the machine attendant. While position offset may be programmed for a variety of reasons, in a machine control system position offset is normally desired to compensate for nonstandard tool dimensions or to permit programming of a desired position to a centerline of a tool with the actual tool dimension being set in at the manually operated dial switches.

The dial operated switches are coupled to the overshoot count register so that the magnitude of the position offset which is dialed may be inserted into the overshoot count register. This requires two considerations: first, the preceding or old position offset must be accounted for in the position count register if the movement to the succeeding or new desired position is to be valid, and secondly, the new position offset must be also introduced into the position count register if the machining operation which is desired is to be performed with respect to the succeeding or new desired position.

In accomplishing this a storage facility is provided which stores information for selecting switches having both the old and the new indications of position offset. In view of the fact that there is a reversal of sign in combining the overshoot count which is transferred from the overshoot count register to the position count register for the reasons described hereinabove, consideration of this reversal in the dynamic transfer must be made in connection with the transfer of the magnitudes of the counts of the old and new position offsets. Thus, the old position offset is transferred without the sign reversed and the new position offset must be transferred with the sign reversed. The order of transfer is (1) the transfer of old desired position from the dial switches to the overshoot count register and thence to the position count register, and (2) after this transfer is completed the new position offset is transferred to the overshoot count register with the sign reversed, whereupon it is transferred to the position count register.

An object of this invention is to provide a numerical control system of the incremental positioning type having position offset control facilities permitting incremental positioning to new positions from preceding incremental positions.

BRIEF DESCRIPTION OF THE DRAWINGS

Other objects and advantages of this invention will become apparent from a study of the following specification when considered in conjunction with the accompanying drawings in which corresponding parts throughout the several views are correspondingly numbered and wherein:

FIG. 1 is a block diagram of a numerical control system incorporating a position offset control embodying the principles of this invention.

FIG. 4 is a block diagram of that portion of the numerical control system for producing delayed clock pulses during the period when the magnitude of the count of the overshoot count register is being transferred to the position count register.

FIG. 5 is a block diagram of an arrangement for developing the move signals which command the movement in the axis and the count register signals for causing counting of the position count register.

FIG. 6 is a block diagram of a circuit arrangement for generating clock pulses which are used to count down the overshoot register and to cause counting in the position count register during intervals when the magnitude of the count of the overshoot register is being transferred to the position count register.

FIG. 14 is a block diagram of a tool offset sequencer circuit which is utilized in the development of signals both for initiating and controlling the sequence of transfer of the position offset or tool offset signals which are generated.

FIG. 15 is a timing signal diagram showing the relationship among the tape row counter signals, the tape feed hole signals and information signals on the tape.

FIG. 16 is a timing signal diagram showing the relationship of a tape feed hole signal, a triggering signal, an information signal and a tape row distribution signal.

FIG. 17 is a block diagram depicting the tool offset storage circuits which are used for storing the tool offset signal information.

FIG. 18 is a block diagram depicting the tool offset enter circuits which are used for controlling the transfer of the tool offset signal information from the dial switches to the overshoot counter.

FIG. 19 is a block diagram depicting the tool offset switches and their connection to the overshoot counter, together with their control of the sign flip-flop for the overshoot counter.

Figure 3:
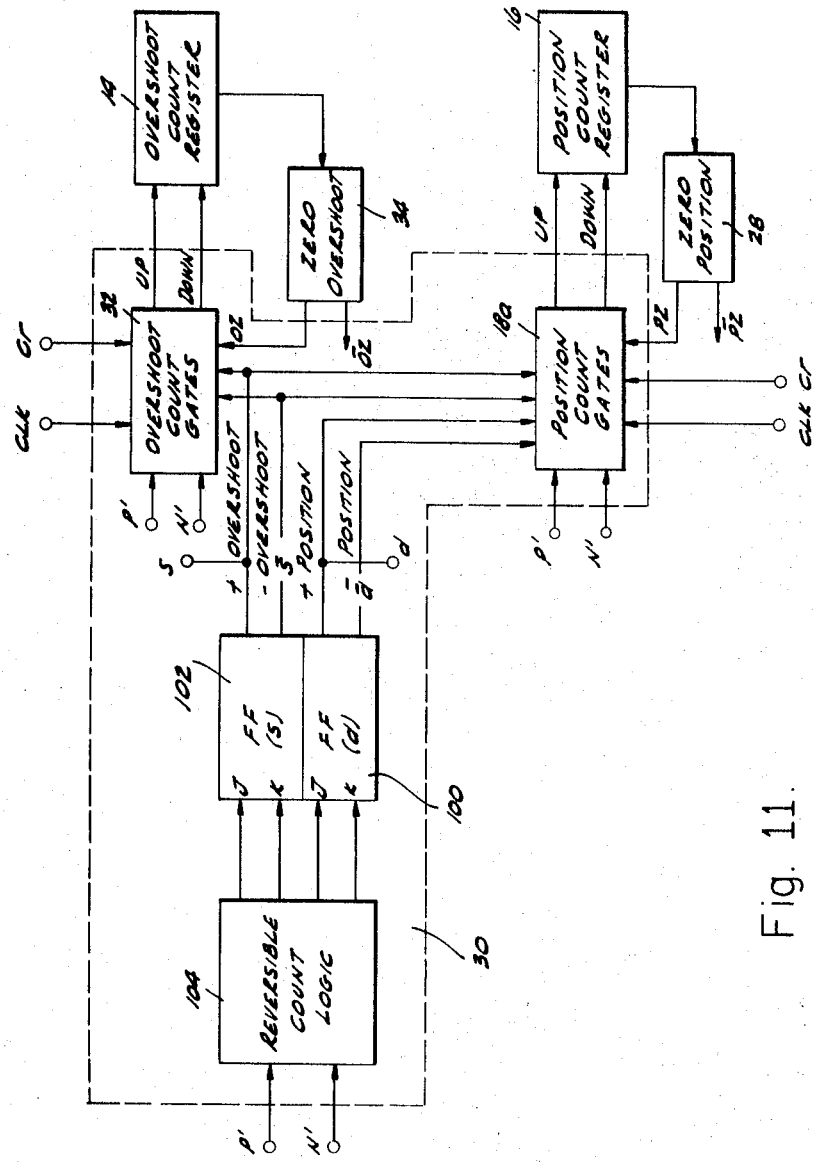
FIG. 3 is a block diagram of that portion of the electrical control involving the overshoot sign flip-flop and the directional sign flip-flop for controlling the direction of counting of the overshoot count register and the position count register.

Conventional logic symbols are employed in illustrating a presently preferred embodiment of this invention which will hereafter be described. The conventional logic elements comprise AND Gates, OR gates, as well as inverter circuits and flip-flops. Monostable multivibrators, hereafter referred to as one-shot circuits, are used as pulse shaping circuits or as delay elements in the preferred embodiment.

The present invention employs JK flip-flops as bistable switches although other bistable switches are usable. As is well known to those skilled in the art the JK FLIP-flop is capable of changing electrical state (from true to false or vice versa) on its output terminals if switching pulses are applied to both of its J and K inputs simultaneously. If a switching pulse is applied to the J terminal of a flip-flop previously set false the flip-flop will change to a true state but if the flip-flop is true and the J input is enabled or pulsed the flip-flop will not change. On the other hand, should the flip-flop be true and its K input is enabled or pulsed the flip-flop will change to false. If the flip-flop is already in a false state and the K input is enabled or pulsed the flip-flop will not change electrical state.

Turning now to a more detailed description of this invention and referring to FIG. 1, the arrangement illustrated therein is primarily directed to the control of a machine tool and the electrical control system used therewith. The details of such a system are illustrated and described in U.S. Pat. No. 3,209,222 for a "Discrete Signal Electrical Positioning Control System," issued to J. K. Holy on Sept. 28, 1965, and assigned to the assignee of this invention. Further particular details of an arrangement of this type may be had by reference to U.S. Pat. No. 3,252,147 for an "Electrical System of control," issued to E. J. Toscano on May 17, 1966, and also assigned to the assignee of this invention.

With reference to FIG. 1, the information input equipment 10 may include any suitable type of discrete signal program. For the purpose of this specification it will be assumed to include a suitable tape reader system having a perforated tape which may be read by suitable types of phototransducers, such as self-generating devices. These photoelectrical devices occupy one impedance or voltage state when dark and a second impedance or voltage state when illuminated with light. The details of such a phototransducer system may be found by reference to U.S. Pat. No. 2,848,698, issued to T. T. Kumagai et al. on Aug. 19, 1958, and assigned to the assignee of this invention.

The output of such information input equipment 10, in the form of serially presented signal groups, is distributed by suitable electrical controls 12 to a position count register 16 by a position count register logic circuit 18. The position count register 16 may be a reversible up/down counter, as previously mentioned, which comprises a digital counter which has a plurality of flip-flops coupled for successive enabling by the state of the preceding flip-flop and further input enabling signals. Input means capable of providing the said further input signals, for example, may include a storage means for storing the sign of the counters whether the counter will count in an up or down mode; gating means for controlling the sign of the storage means; and further gating means for proper channeling of increase counter signals or decrease count signals into the count up or count down inputs of the counter.

When the information input equipment has loaded the desired data into the position count register 16 via circuits identified SET and it has reached its count as determined thereby, a feed axis drive 20 is enabled by the electrical control 12. The feed axis drive is enabled by the production of move signals Mn or Mp. These signals are produced whenever the bilevel control signal PZ switches from that level indicating the position count register is at zero count to a different level indicating the position count register is not at a zero count. The feed axis drive is mechanically coupled to a feed axis 22. The movement of feed axis 22 and the machine element coupled therewith is detected by a transducer 24. The output of the transducer 24 is coupled into a count generator 26 which produces the axis pulses P or N. Pulse logic circuits 25 receiving the pulses P or N and count gates 30 couple count pulses P' or N' over the connections marked UP or DOWN to cause counting of the position count register 16 toward its zero count condition. Upon reaching the zero count condition a zero-indicating logic circuit 28 is enabled and the signal PZ returns to its zero-count-indicating level to disable that portion of the electrical control 12 producing the Mn or Mp signals to cause the electrical control 12 to cease operation of the feed axis drive 20. The zero-indicating logic circuit 34 is also coupled to enable count gates 30 which in turn will enable the overshoot count register 14, as will be seen, to accept the first P' or N' pulse from feed axis 22 when overshoot occurs. Upon starting the next position move and providing the contents of the overshoot count register 14 is not at zero as indicated by zero indicating logic 34, clock pulse logic 36 circuit, which is coupled to a clock pulse generator 37, will produce clock pulses CLK which, via count gates 30, will count down the overshoot count register while counting the position count register up or down to effectively transfer the count of the overshoot count register to the position count register 16. The transfer occurs one count at a time with each clock pulse. The overshoot count register is always counted down by the clock pulses and the position count register will be counted up or down depending upon the relationship of the signs of the position and overshoot count registers.

The position count gate 18a which enables position count register 16 to count up or down has for enabling inputs, as shown in FIG. 3, a pulse P' and a pulse N' generated by the pulse logic circuit 25, a signal s from a directional flip-flop which indicates the sign of the overshoot count register 14, a signal d which indicates the sign of the position count register 16, a clock signal (CLK) and a count register signal Cr which is an output signal from a count register flip-flop and which is ordinarily on when the feed axis drive 20 is enabled. The logical details of the position count gate 18a will be explained later.

Both the overshoot count register 14 and the position count register 16 used in this control system are bidirectional and reversible counters as previously mentioned. The count of the overshoot register 14 is serially algebraically combined with the count of the position count register 16 by means of pulses generated by the clock pulse generator circuits 36 and 37. The clock pulse generator 37 may be, for example, a free-running multivibrator which produces pulses which are gated by the clock pulse logic circuits 36. The gated pulses CLK are used to count the overshoot count register 14 down to zero and the position count register 16 up or down depending upon whether the sign of the position count register 16 is the opposite or matches the sign of the overshoot count register 14, respectively, that is, when $s=d$ (in Boolean notation) count down of the position count register 16 occurs. During this time the axis incremental transducer system comprising the count generator 26 and the transducer 24 may produce either P pulses or N pulses depending upon the direction of movement in the axis. It can be seen that the P or N pulses must be counted properly as they represent physical displacement of the controlled elements.

Figure 12:
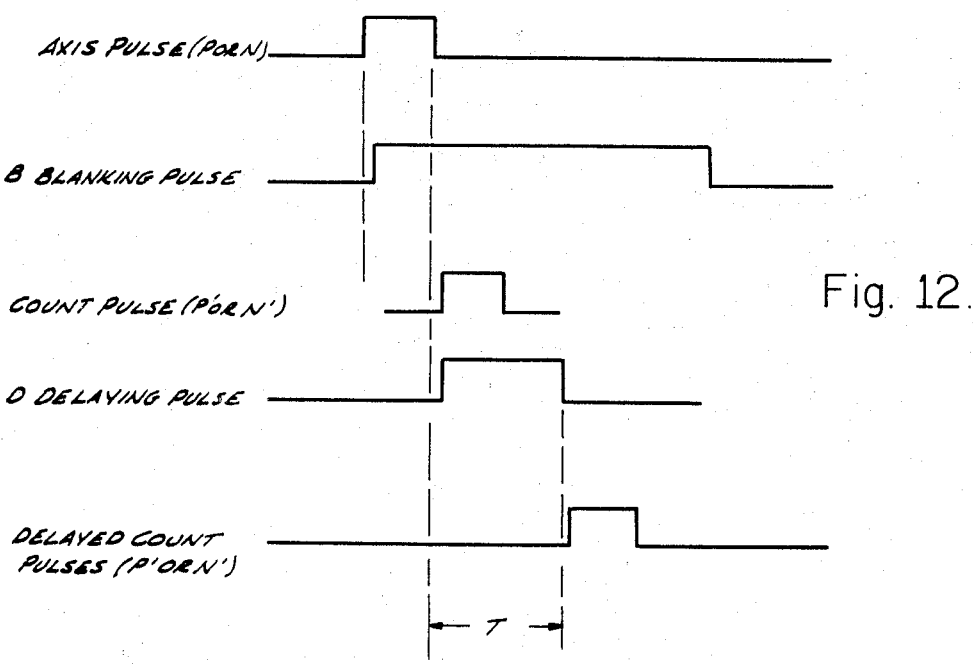
FIG. 12 is a timing signal diagram showing the relationship of the different signals which are used for developing the delayed count pulses.

In order to avoid coincidence of individual pulses P' or N', individually representing an increment of movement in the axis, positive or negative, respectively, with individual clock pulses CLK, a device must be used that warns the circuitry that an axis pulse P' or N' is forthcoming as these pulses occur synchronously with increments of movement in the axis. There is no way of knowing the impending generation of a pulse P' or N'. To solve this problem a time delay is provided which is shown in FIG. 4 and a graphic illustration of these pulses is shown in FIG. 12.

The delayed axis pulse is provided and can be stated in the following equation as stated in Boolean's notations:

$P' = \overline{to} \cdot P + to \cdot P$ (delayed)
$N' = \overline{to} \cdot N + to \cdot N$ (delayed)
$to(J) = Cr$
$to(K) = OZ \, \overline{B}$
$B = P + N$ (delayed)

Where (to) is the set or true output of a transfer overshoot flip-flop 50 which enables the transfer of the count of the overshoot register 14 into the position register 16; Cr is the true output of the count register flip-flop 74, as shown in FIG. 5 and yet to be explained, which is on during movement of the feed axis 22; and OZ is the output of the zero-indicating logic 34 which indicates the count of the overshoot register 14 is at zero.

The above equation is implemented by the circuit shown in FIG. 4 which has P and N pulses coupled as input gating signals to an OR-gate 40. The output therefrom is coupled to a one-shot circuit 42 the output signal B of which is coupled as input to an inverter 44, the output signal of which is designated $\overline{B}$ at a terminal 46. The output signal $\overline{B}$ of the inverter 44 is coupled as one enabling input signal to an AND-gate 48 which has for its other enabling signal the signal OZ, signal OZ being an indication that the count of the overshoot count register 14 is zero. The output of the AND-gate 48 is coupled to the K input terminal of the flip-flop 50 and the J input terminal of flip-flop 50 receives the count register signal Cr. The output signals of flip-flop 50 are designated to and $\overline{to}$. The signal to is coupled as an enabling signal to an AND-gate 51 which when enabled gates a pulse P. The output of AND-gate 51 is coupled to a delay one-shot circuit 52. The signal to is also coupled as an enabling input to an AND-gate 53 which when enabled gates a signal P and is also coupled as an input signal to a delay one-shot circuit 54. Thus, the pulse P generates P' immediately in the presence of a signal $\overline{to}$ and delays in the presence of to. The signal to by itself, that is, without a pulse P or a pulse N, does not generate a pulse P' or a pulse N'. The signal $\overline{to}$ is coupled as an enabling input to the AND-gate 56 which when enabled gates the pulses P. The signal $\overline{to}$ is also coupled as an enabling input to AND-gate 58 which when enabled gates the pulses N. The output of the one-shot circuit 52 and the output of AND-gate 56 are individually gated by an OR-gate 60. Likewise, the output of the one-shot circuit 54 and the output of AND-gate 58 are individually gated by an OR-gate 62. The output of the OR-gate 60 is coupled as an input to a one-shot circuit 64 and the output therefrom provides the pulse P' and may be coupled through an inverter 66. The output from inverter 66 thus provides the pulse $\overline{P'}$. The output of the OR-gate 62 is coupled as an input to the one-shot circuit 67 and the output therefrom provides the pulse N' which may be coupled to an inverter 70, the output of inverter 70 thus provides the pulse $\overline{N'}$.

It can be seen that the axis pulse P is delayed by the one-shot circuit 42 and forms the blanking pulse B. The outputs of the OR-gates 60 and 62 may provide the feed axis counting pulses from transducer 24 which are delayed and indicated as P' and N'.

The leading edge of the axis pulse P (or N) triggers the one-shot circuit 42 whose output B shall be called the blanking pulse as previously stated. The trailing edge of the axis pulse P (or N) turns on the one-shot circuit 64 (or 67) whose output pulse P' (or N') is now accepted by the counting circuitry 18 as the axis pulse which is to be counted.

In this manner a certain time before a counting pulse P' is applied into the counters a warning signal in the form of the pulse B is generated. The pulse B should be long enough to blank out the counting of a pulse P' including the register ripple time indicated by the letter T in FIG. 12. The duration of pulses P, N, is sufficient to allow switching of the counting gates 18 and 32 and associated circuits, as hereafter explained, from the pulses CLK over the pulses P' or N' and to allow for completion of counting of the latest pulse CLK that could have passed before the blanking pulse B was generated.

The initial move pulse Cr is provided by a count register flip-flop 74. The J and K inputs of the flip-flop 74 are enabled by signals related in the sense expressed by the following equations in Boolean notation:

$Cr(J) = \overline{B} \cdot M$
$Cr(K) = \overline{B} \cdot \overline{M}$ \hfill (2)

Where B is the inverted blanking pulse axis drive and the signal OS is the output of a one-shot circuit 82 which prevents the flip-flop 74 from turning off for a certain period of time immediately following the disappearance of a move command when the axis is traveling at a high rate of speed. The move command signals Mp or Mn result from the directional signals $d$ or $\bar{d}$ and the move signal $M$ from a flip-flop 76. The signals $d$ or $\bar{d}$ from the directional flip-flop 100 indicate the sign of the position register 16. If the flip-flop 100 is true, the signal $d$ exists and the position register 16 will count up in the presence of pulses $P'$, and if the flip-flop 100 is false the signal $\bar{d}$ exists and the position register 16 will count down in the presence of the pulses $P'$. This will be explained in more detail later in connection with the up/down count logic. The move signal M is the output of the flip-flop 76 which is designated as a move flip-flop which is turned on by a move command emanating from the information input equipment 10 and turned off upon the occurrence of the signal PZ which is produced when the count of the position register 16 reaches zero (provided that the count of the overshoot register 14 has been algebraically combined in the position register 16, at which time the signal OZ exists); thus, the flip-flop 76 may be enabled as the following Boolean equation indicates:

$m(j)$ = output from the information input equipment 10

$m(K) = PZ \cdot \overline{PZ \cdot to}$ \hfill (3)

Where PZ and OZ are the respective outputs of the zero-indicating logic circuits 28 and 34 which indicate, respectively, that the count of the position register 16 is at zero and that the count of the overshoot register 14 is zero.

The equations (2) and (3) can be implemented as shown in FIG. 5. In this figure the output from the information input equipment 10 is coupled to the J input of the move flip-flop 76. The AND-gate 78 has as its enabling inputs the signals OZ and PZ, indicating that the counts of both the overshoot register and the position register 16 are at zero. The output of AND-gate 78 is coupled to the K input of the move flip-flop 76. The true output signal M of the move flip-flop 76 is coupled along with the true signal $d$ as enabling inputs to an AND-gate 80, the output of which, via an OR-gate 83, may be reshaped by the one-shot circuit 82. The output of one-shot circuit 82 along with a blanking signal $\bar{B}$ are presented as enabling terms to an AND-gate 84 and the output therefrom is coupled to the J input terminal of the count register flip-flop 74. The output of the one-shot circuit 82 is inverted by an inverter 85 and presented to the AND-gate 84 along with the blanking signal $\bar{B}$. The output of the AND-gate 87 is coupled to the K input terminal of the count register flip-flop 74. If the move flip-flop 76 is turned on (signal $M$ at gating level) and the sign of position counter 16 is true or positive, indicated by the signal $d$, an output signal Mp (move positive) will be produced to start the feed axis drive 20 in the positive direction. The resulting pulses $P'$ count down the position count register 16. Note that the position count register 16 is counting down or decreasing in count on the pulses $P'$.

A signal CLK is generated by the clock logic 36. The following equation defines the clock logic circuit:

$CLK = \bar{B} \cdot \overline{OZ} \cdot \text{to}$ output from clock generator 37 \hfill (4)

Note that a blanking pulse signal must not be present, as indicated by signal $\bar{B}$, and that the count of the overshoot register 14 is not at zero, as indicated by the signal $\overline{OZ}$, and that transfer of the overshoot count must be taking place, as indicated by the signal to, between the overshoot register 14 and the position register 16 before a clock pulse CLK can be generated from pulse generator 86.

Circuitry to implement this equation is best shown in FIG. 6 wherein clock pulse generator 37 is coupled to AND-gate 88. The signals $\bar{B}$, $\overline{OZ}$ and $(\overline{to})$ are the enabling signals applied to AND-gate 88. The output of the AND-gate 88 is coupled as an input to a one-shot circuit 90 for pulse reshaping purposes and the output of the one-shot circuit 90 thus provides the output clock pulse CLK.

Figure 11:
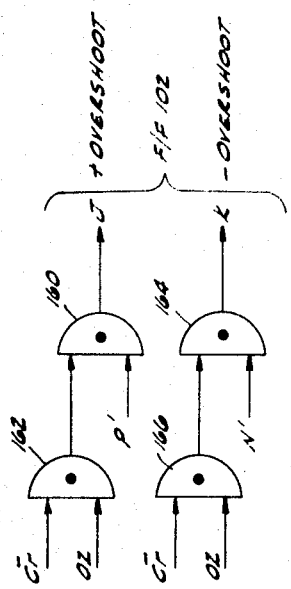
FIG. 11 is a block diagram depicting the way in which the sign flip-flop for the overshoot counter is controlled.
Figure 2:
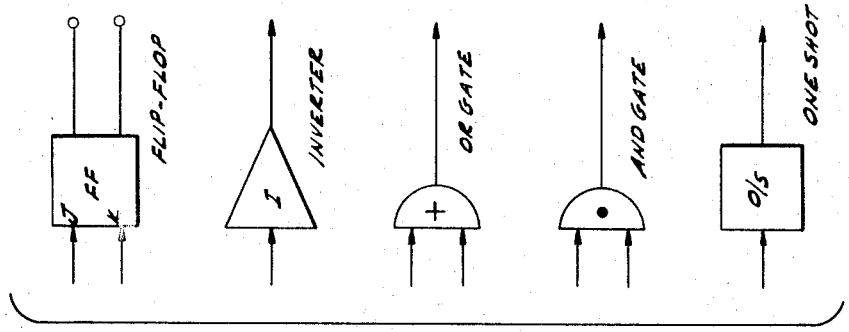
FIG. 2 depicts selected drawing symbols which are employed to identify flip-flops, inverters, OR gates, AND gates and one-shot circuits.

As previously stated the position count register 16 will count down in the presence of a directional sign signal $d$ if a pulse $P'$ is generated by pulse logic circuit 25 and will also count down in the presence of a directional sign signal $\bar{d}$ if a pulse $N'$ is generated by pulse logic 25. The position count register 16 will count up on the directional sign signal $\bar{d}$ if a $P'$ pulse is generated and will also count up on the directional sign signal $d$ if an $N'$ pulse is generated. Thus, the direction in which the position register counts in the presence of the pulse $P'$ or $N'$ depends upon the sign of the register, i.e., signal d or signal $\bar{d}$. When the desired movement in the axis is in the direction arbitrarily chosen as the negative direction, the directional flip-flop 100 is switched to produce the signal $\bar{d}$. When the movement is negative the pulses $N'$ are generated. When movement in the opposite or positive direction is desired the directional flip-flop is switched to produce the signal $\bar{d}$. When the movement is positive the pulses $P'$ are generated. The directional sign signal $d$ which indicates the sign of the positive count register is generated by a directional flip-flop 100 as shown in FIG. 3 under the control of the reversible count logic 104. Two inputs to the directional flip-flop 100 are coupled from the reversible count logic 104. The directional flip-flop 100 may be controlled from the stored program as in U.S. Pat. No. 3,209,222 referred to above or by a manual switch to indicate the direction of movement and the sign of the position register. The control of the sign flip-flop 102 for the overshoot counter is shown in FIG. 11.

The logic is as follows for the control of the position count register 16:

Count up = $Cr \cdot PZ \cdot (N'+P') + Cr \cdot \bar{d} \cdot P' + Cr \cdot d \cdot N' + CLK \cdot PZ + \bar{d} \cdot s \cdot CLK + s \cdot CLK$. \hfill (5)

Count down = $Cr \cdot \overline{PZ} \cdot d \cdot P' + Cr \cdot \overline{Pz} \cdot \bar{d} \cdot N + \overline{PZ} \cdot d \cdot s \cdot CLK + \overline{PZ} \cdot \bar{d} \cdot \bar{s} \cdot CLK$ \hfill (6)

Figure 7:
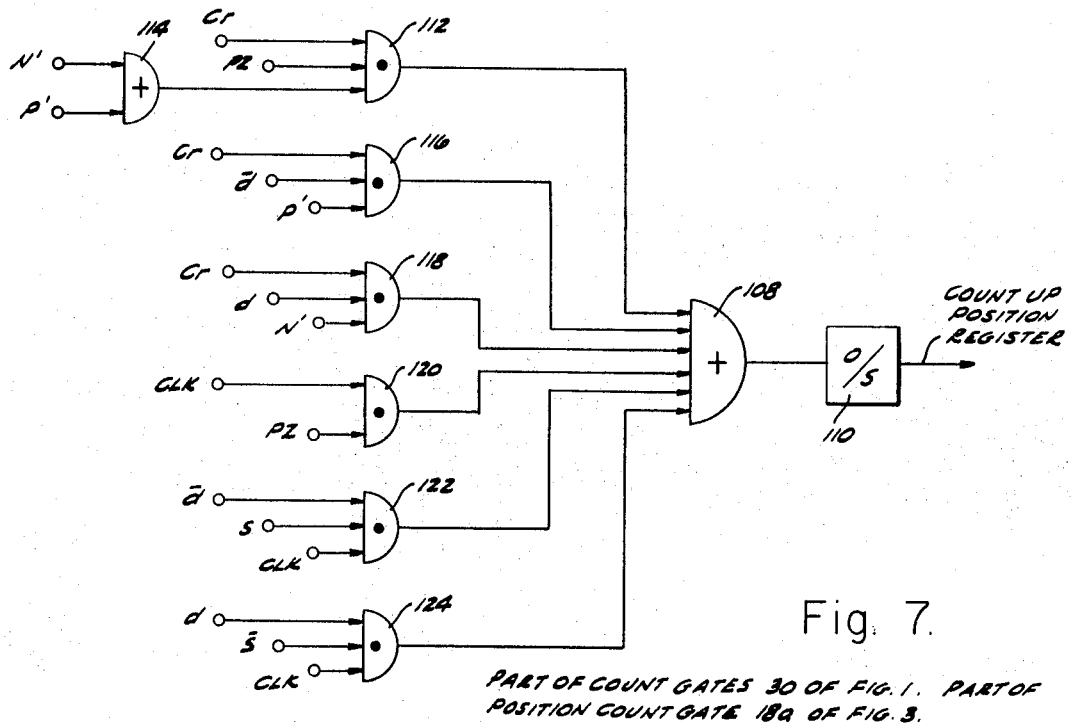
FIG. 7 is a block diagram depicting the way in which the position count register is counted up in the presence of either count pulses developed by movement in the axis or clock pulses developed for transferring the magnitude of the overshoot count.

Implementation of Equation 5 is best shown, by way of example, in FIG. 7. An OR-gate 108 receives a plurality of inputs and has an output coupled to a one-shot circuit 110 and the output thereof is coupled to the count up input of the position register 16. One of the inputs of OR-gate 108 comes from the output of AND-gate 112 which is enabled by the count register signal Cr and the position count register zero signal for gating the pulses $P'$ or $N'$ received from an OR-gate 114. This gate 112 causes the register to count up from zero in the presences of pulses $P'$ or $N'$. OR gate 108 is also enabled by the output of an AND-gate 116 which is enabled by the count register signal Cr and the negative direction or sign signal $\bar{d}$ for gating the pulses $P'$. This gate causes the register to count up in the presence of positive pulses $P'$ when the register sign signal is negative ($\bar{d}$). OR-gate 108 is also enabled by an AND-gate 118 which is enabled by the count register signal Cr and the positive direction sign signal $d$ for gating negative direction pulses. This gate causes the register to count up in the presence of negative direction pulses $N'$ when the register sign signal is positive ($d$); by an AND-gate 120 which is enabled by the position count register zero signal PZ for gating clock pulses CLK; by an AND-gate 122 which is enabled by the negative direction sign signal $\bar{d}$ for the position register $\bar{d}$ and the positive overshoot sign signal s for gating clock pulses CLK; and by an AND-gate 124 which is enabled by the positive direction sign signal d and the overshoot sign signal s for gating clock pulses CLK.

Recalling that in a positioning operation the position count register is operated in a count down mode, the gates described above cover the conditions under which the register must be counted up. These are summarized as follows:

1. Count up when the count of the position count register is zero in the presence of positive direction pulses $P'$, negative direction pulses $N'$ or clock pulses CLK.

2. Count up when the direction sign signal does not correspond with the direction count pulse.

3. Count up in the presence of clock pulses when the direction sign signal for the position count register is different from the sign signal for the overshoot counter.

Figure 8:
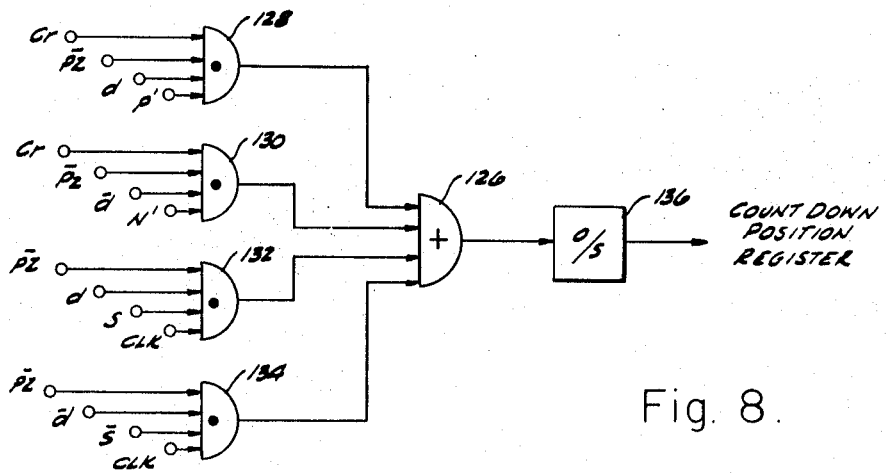
FIG. 8 is a block diagram similar to that of FIG. 7 for causing counting down of the position count register in either the presence of the count pulses developed by movement of the movable element in the axis or clock pulses developed for transferring the magnitude of the count of the overshoot count.

The count down input for the position count register is controlled by the logic circuit as shown in FIG. 8 wherein an OR-gate 126 has a plurality of inputs which are individually enabled by the following AND gates:

An AND-gate 128 which is enabled by the count register signal Cr, a signal $\overline{PZ}$ which indicates the position count register is not at zero count and the positive direction signal d for gating the pulses $P'$; by an AND-gate 130 which is enabled by the signal $Cr$, the signal $\overline{PZ}$ and the negative direction signal $\overline{d}$ for gating the negative direction pulses $N'$; by AND-gate 132 which is enabled by the signal $\overline{PZ}$, the positive direction sign signal $d$, and the positive sign signal $s$ for gating clock pulses $CLK$; and by AND-gate 134 which is enabled by the signal $\overline{PZ}$ and sign signals $\overline{d}$ and $\overline{s}$ for gating clock pulses $CLK$. The output of the OR-gate 126 is coupled to the input of a one-shot circuit 136 which reshapes the pulse and provides an output therefrom to the count down input of the count register position 16.

Thus, gates 128 and 130 gate count pulses $P'$ and $N'$, respectively, which count down the position count register when there is movement in the axis, signal $Cr$ when the register is not at a count of zero, signal $\overline{PZ}$, and when the directional sign signal $d$ or $\overline{d}$, indicating the desired direction of movement, is the correct sign signal for the count pulse $P'$ or $N'$ which is being generated. Similarly, gates 132 and 134 gate clock pulses $CLK$, which count down the register, during the transfer overshoot operation, signal $to$, when the count of the register is not zero, signal $\overline{PZ}$, whenever the sign of the overshoot register is the same as the sign of the position count register.

Count up of the overshoot count register 14 is accomplished in a manner similar to the count up of the position count register 16. The count up and count down of the overshoot count register can be accomplished in the manner defined by the following logical equations:

Count up $= \overline{Cr}\, OZ\, (P'+N')+\overline{Cr}\, s\, P'+\overline{Cr}\, \overline{s}\, N'$ (7)

Count down $= \overline{Cr}\, \overline{OZ}\, \overline{s}\, P'+\overline{Cr}\, \overline{Oz}\, s\, N'+CLK$ (8)

Figure 9:
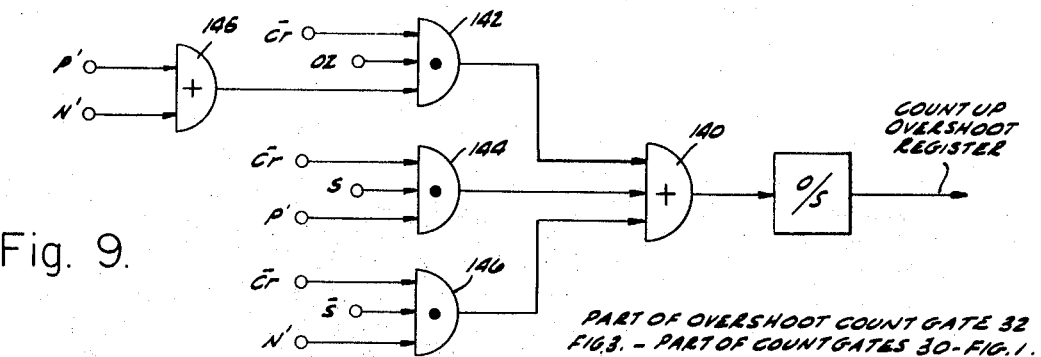
FIG. 9 is a block diagram showing how the overshoot count register is counted up in the presence of count pulses resulting from movement of the movable element in the axis.

The above equation (7) can be implemented by the logic circuitry shown in FIG. 9 which includes an OR-gate 140 which receives a plurality of inputs.

Figure 10:
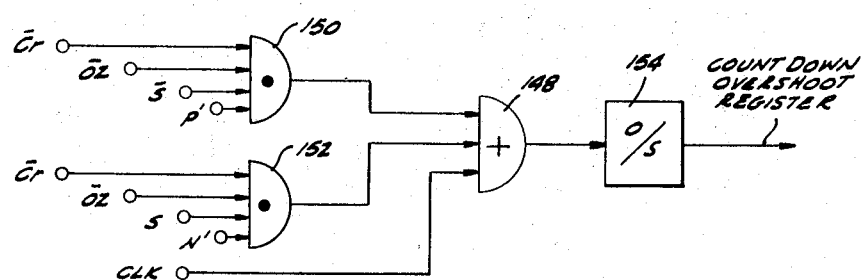
FIG. 10 is a block diagram showing how the overshoot count register is counted down in the presence of count pulses resulting from movement in the axis or in the presence of clock pulses.

OR-gates 140 is enabled by the output of AND-gate 142 which is enabled by a signal $\overline{Cr}$ which indicates the position count register is not being counted and a signal $OZ$ which indicates the count of the overshoot counter is zero, for gating the count pulses $P'$ or $N'$ from the OR-gate 145. OR-gate 145 gates either the count pulses $P'$ or the count pulses $N'$. OR-gate 140 is also enabled by an AND-gate 144 which is enabled by the signal $\overline{Cr}$, a sign signal $s$ showing the sign of the overshoot counter is positive and a positive direction count pulse $P'$; and by AND-gate 146 which is enabled by the signal $\overline{Cr}$, a signal $s$ showing the sign of the overshoot counter is negative, and a negative direction count pulse $N'$. FIG. 10 illustrates a logical implementation of equation (8) providing count down signals to overshoot count register 14. This logic circuitry comprises an OR-gate 148 which gates the clock pulses $CLK$ or the outputs of either of the AND-gates 150 or 152. The AND-gate 150 is enabled by the signal $\overline{Cr}$, the signal $\overline{OZ}$ which indicates the overshoot counter is not at a count of zero, the negative sign signal $\overline{s}$ and the positive direction count pulses $P'$. AND gate 152 is enabled by the signal $Cr$, the signal $\overline{OZ}$, and the positive sign signal $s$ for gating negative direction count pulses $N'$. The output of OR-gate 148 is coupled as an input to a one-shot circuit 154, the output therefrom is coupled to the count down input of the overshoot count register 14.

The logic for enabling the sign flip-Flop 102, the output of which indicates the sign of the overshoot count register, may be stated as follows:

$S\, F/F\, 102\, (j) = \overline{Cr}\, OZ\, \overline{P'}$ $S\, F/F\, 102\, (k) = \overline{Cr}\, OZ\, \overline{N'}$ This is best shown in FIG. 11 where the output of the AND-gate 160, which gates count pulses $P'$, is coupled to the $J$ input of the sign flip-flop 102 and is enabled by the output of the AND-gate 162 which is in turn enabled by a signal $\overline{Cr}$, which indicates the position count register is not being counted, and the signal $OZ$. Thus, should the count of overshoot register 18 be zero and the count register flip-flop 74 be false, in the presence of a pulse $P'$, the sign flip-flop 102 will be true. The output of the AND-gate 164, which gates count pulses $N'$, is coupled to the $K$ input of the sign flip-flop 102 and is enabled by the output of the AND-gate 166 which in turn is enabled by the signal $\overline{Cr}$ and the signal $OZ$, thus setting flip-flop 102 false.

In operation of the present invention, at the start of a movement in the feed axis 22, the desired dimension of that move is stored as a count in the position count register 16 and any accumulated overshoot movement from an immediately preceding movement is stored in the overshoot count register 14. If the position count register logic 18 is turned on by a move command from the electrical control 12, counting into the overshoot register is blocked and counting of the position register 16 is enabled. The turn on of the count register logic 18 is prevented if a blanking pulse B is presented thereto from the blanking pulse logic 27 and, as explained in connection with FIG. 4, a B pulse indicates that an axis pulse $P$ or $N$ is in process. If there is time coincidence between a blanking pulse $B$ and a move command signal $M$ from the electrical control 12, the count register logic 18 may or may not change state. In either case, because the origination of the count pulse $P'$ (or $N'$) lags, blanking pulse $B$ by the width of a pulse $P$ (or $N$), the blanking pulse $B$ is produced by the leading edge of the pulse $P$ and the pulse $P'$ by the trailing edge of the pulse $P$, the pulses $P'$ (or $N'$) will be counted properly into either the position count register 16 or the overshoot count register 14, particularly in view of the extra delay of the pulse $P'$ (or $N'$) by the one-shot delay circuit 52 (or 54) which further delays the pulse $P'$ (or $N'$).

When the count register flip-flop 74 turns on, it in turn sets true the transfer overshoot flip-flop 50 (FIG. 4). The signal ($to$) is one enabling term on the AND-gate 88 (FIG. 6) which with the other signals permits gating of the output of the clock generator 37 to the one-shot circuit 90 for producing pulses $CLK$ which are used during transfer overshoot signal $to$, to count down the overshoot register while algebraically combining the count of the overshoot register with the count of the position count register 16.

In this mode of operation the pulses $CLK$ count down the overshoot count register 14 (the overshoot count register 14 is not accepting any axis-generated count pulses $P'$ or $N'$ because the count register flip-flop 74 is true) and the position count register 16 counts up or down as required by comparison of the sign signals produced by the sign flip-flops 100 and 102, respectively.

If a random axis pulse $P$ should appear, a blanking pulse will immediately stop the pulses $CLK$ during the duration of the blanking pulse or signal $B$. If the blanking pulse or signal $B$ and the clock pulse $CLK$ coincide a clock pulse $CLK$ may or may not be generated. If a clock pulse $CLK$ is allowed to be generated it should be allowed to be counted by position count register 16 before the axis or count pulse $P'$ is generated by pulse logic circuits 25 when an axis or count pulse is presented from count generator 26. To insure this whenever a transfer of the magnitude of the count of the overshoot register is in process and the transfer overshoot flip-flop 50 is on, an additional delay is inserted between the trailing edge of the count pulse $P'$ and the count pulse $P$ by the one-shot circuit 52 wherein when the transfer overshoot flip-flop 50 is set true the trailing edge of the $P$ pulse does not enable or initiate the production of a pulse $P'$ directly through the one-shot circuit 64 but rather triggers the one-shot circuit 52 in series with the one-shot circuit 64, as seen in FIG. 5. In this manner, a clock pulse $CLK$ occurring simultaneously with a count or axis pulse $P$ (so that the blanking pulse or signal $B$ generated by the axis or count pulse $P$ is too late to stop the clock pulse $CLK$) is allowed to be counted during the duration of the axis or count pulse $P$ plus the duration of the delay signal $D$ to generate and count a register pulse. The extra delay between the pulse $P$ and the pulse $P'$ is removed when transferring is not taking place (flip-flop 50 being turned off) because this extra delay will interfere with high-speed counting by adding tolerance and recovery time factors to the generation of the axis or count pulse $P'$.

When the overshoot register 14 is counted down to zero, the zero count signal $OZ$ is produced and the transfer flip-flop 50 is turned off, preventing further clock pulses CLK from being generated. As the zero count signal OZ may occur at a time when there is an axis or count pulse P' or N' in existence, the turning off of the transfer overshoot flip-flop 50 by the signal OZ is delayed if a blanking pulse or signal B is present from the blanking pulse logic circuits 27. Otherwise, the change of state of the transfer overshoot flip-flop 50 may split an axis or count pulse P' and result in the counting of a pulse P' in both the position count register 16 and the overshoot count register 14. The addition of the blanking pulse or signal B, however, introduces another problem in the possibility of an unwanted clock pulse CLK getting through after the overshoot count register is counted down to zero, signal OZ, and while the transfer overshoot flip-flop 50 waits for the end of the blanking signal B in order to be turned off thereby and thus block further clock pulses CLK. To correct this the signal $\overline{OZ}$ is used as an additional enabling signal on the AND-gate 88 which triggers a one-shot circuit 90, as shown in FIG. 6. The movement started by the information input equipment which turns on the move flip-flop 76, as shown in FIG. 5, which turns on the count register flip-flop 74, which turns on the transfer overshoot flip-flop 50 (see FIG. 4), proceeds as the transfer of the overshoot count takes place after which transfer the transfer overshoot flip-flop 50 is turned off by the zero overshoot count signal OZ (see FIG. 4).

POSITION OFFSET CIRCUITS

Figure 13:
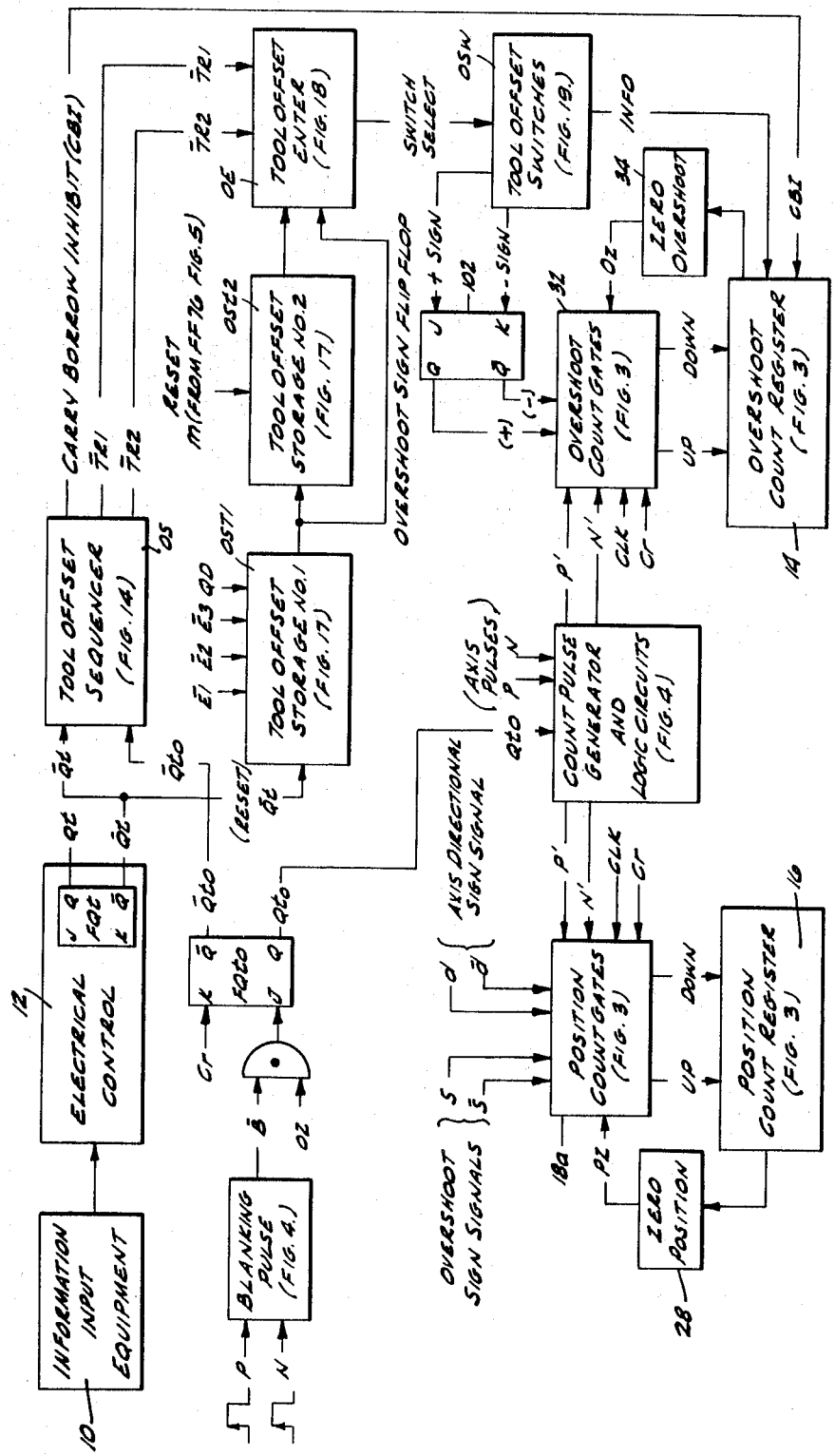
FIG. 13 is a block diagram specifically illustrating the organization of the position offset circuits of this invention in the general electrical control system depicted in FIG. 1.

From FIG. 1 it will be recalled that the information in the form of electrical signals derived from the information input equipment 10 was coupled to an electrical control 12 from which this information was distributed to selected points in the system. A flip-flop FQt as indicated in FIG. 13 forms a part of such electrical control. This is the transfer flip-flop and is used in initiating the transfer of the position offset information from the dial switches into the overshoot count register, as will be explained in detail. This flip-flop is controlled by information derived from the tape. The tape signal which controls this flip-flop will be identified for descriptive purposes as t. The signal generated by this information on the tape is coupled to the J input terminal of the flip-flop FQt and at such time as the position offset is to be transferred into the system is utilized to set the flip-flop to its 1 or true representing electrical state in which the flip-flop signal Qt is in the higher of its two voltage states. For the purpose of this portion of the description it will be assumed that the flip-flop output voltages which are voltage state signals swing between zero volts the true state or 1 representing electrical state when the flip-flop is turned on to −3 volts the zero or false electrical state when the flip-flop is turned off. Thus when the flip-flop is turned on in its 1 representing electrical state, the signal Qt will be in the higher of its two voltage states and the signal $\overline{Q}t$ will be in the lower of its two voltage states.

This transfer flip-flop controls a tool offset sequencer and a tool offset storage circuit designated OS and OSt1, respectively. The tool offset sequencer circuit is used to generate a pair of signals $\overline{TR}2$ and $\overline{TR}1$ which are utilized to control the transfer of the old and the new information in the dial switches, respectively. The transfer of information from the dial switches is done on a parallel basis. Thus, the overshoot count register which normally operates on a serial basis as described hereinabove so that the position overshoot count is counted down as described must be set so that it may receive the parallel input without generating carries and/or borrows depending upon the electrical states of the flip-flops in the chain. To this end, the tool offset sequencer circuit OS also generates a carry/borrow inhibit signal designated CBI which is coupled to the overshoot count register to prevent the generation of the carry and/or borrow signals during the transfer of information from the dial switches.

The transfer of the magnitude of the desired position offset or tool offset takes place after the transfer of the magnitude of the overshoot count has taken place. At this time it will be recalled the move flip-flop 76 (see FIG. 5) is on so that its move output signal m is generated and the new positioning operation is designated. Thus, any movement in the axis resulting in the generation of the axis pulses P or N must again be considered. Thus, also as illustrated in FIG. 13 these axis pulses are coupled into the blanking pulse circuit for the purpose of generating the signals $\overline{B}$ for controlling the transfer overshoot flip-flop 50 which is illustrated in FIG. 4 and depicted here again in FIG. 13. As will be described in connection with FIG. 14, the output of the transfer overshoot flip-flop 50 is used to inhibit the generation of the transfer signals $\overline{TR}2$ and $\overline{TR}1$ during periods when axis pulses exist.

The signal $\overline{Q}t$ of the transfer flip-flop FQt also controls the tool offset storage circuit No. 1, OSt1. Here it is used as a reset signal to reset the No. 1 storage circuit. Resetting of the No. 1 tool offset storage circuits results in the generation of signals which transfer the information of the tool offset storage circuit No. 1 to tool offset storage circuit No. 2, OSt2. Thus, at the time that a new dial switch selection is to be made the information identifying the old dial switch is transferred into the tool offset storage circuit No. 2 automatically where it is held until needed.

As will be described in connection with FIG. 18, the outputs of both of the tool offset storage circuits are coupled inputwise to the tool offset enter circuit OE. These separate groups of information signals are logically combined in differing sets of logical gates to which the transfer signals $\overline{TR}2$ and $\overline{TR}1$ are coupled as triggering signals to thereby produce outputs in response to $\overline{TR}2$, for example, identifying the old dial switch and later $\overline{TR}1$ identifying the new dial switch.

Figure 20:
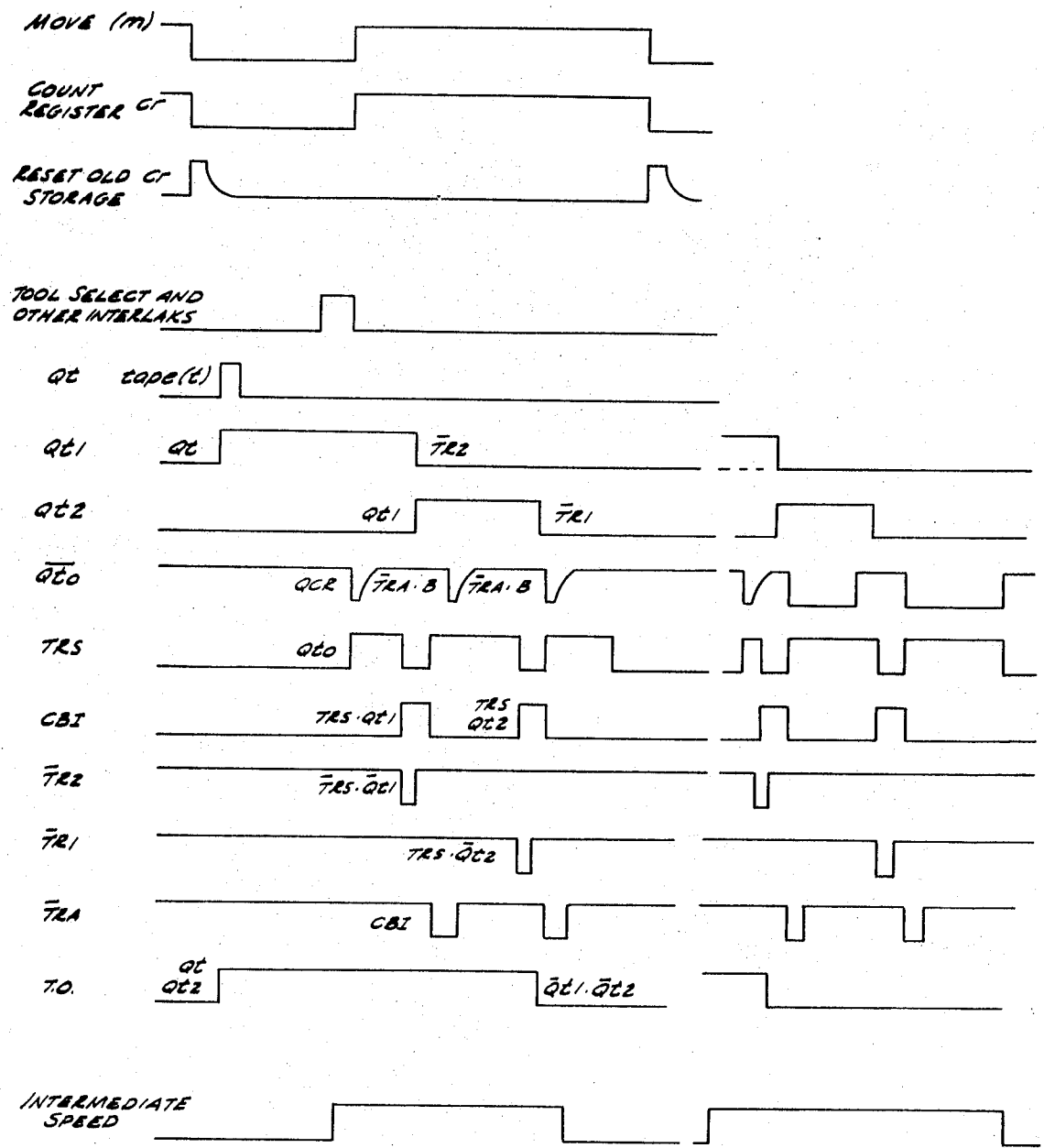
FIG. 20 is a timing signal diagram.

The timing of this transfer will be understood in connection with the following information and also by reference to FIG. 20. Referring to the transfer overshoot flip-flop 50, it will be observed that this flip-flop is turned on by the count register signal Cr. The count register signal Cr remains on as long as there is a move command signal m. The overshoot flip-flop 50 remains on until such time as the overshoot counter is counted to zero, in which case the signal OZ is at gating level. Thus, in the absence of a blanking pulse signal in which case the signal $\overline{B}$ will be at gating level at such time as the overshoot count register is counted to zero, the K input terminal of the flip-flop FQto is triggered and the flip-flop is turned off. Thus, the transfer overshoot flip-flop is off at such time as the transfer flip-flop FQt is turned on by the signal from the tape to initiate the sequence of the tool offset transfer. It will be recalled that turning on of the transfer flip-flop FQt results in resetting of tool offset storage circuit No. 1 and the transfer of information therein to tool offset storage circuit No. 2. By reference to FIG. 16 and noting the input signals on tool offset storage circuit No. 1 it will be seen that information derived from the tape in the form of $\overline{E}$ signals, which are the tape track information signals, may be coupled into the memory circuits of tool offset storage circuit No. 1 upon the occurrence of a signal QD2 which is the tape row distribution signal, that is, that row of tape which contains the information as to the new dial switch as represented in the differing signals designated $\overline{E}1$, $\overline{E}2$ and $\overline{E}3$ as seen in FIG. 13.

Now the information as to the old dial switch is stored in tool offset storage circuit No. 2 and the information as to the new dial switch is stored in tool offset storage circuit No. 1. Additionally, these dial switch information signals are coupled inputwise to the tool offset enter circuit OE. Now when the overshoot count register is counted down to zero so that the transfer of the overshoot count is completed and the transfer overshoot flip-flop 50 is turned off, the signal $\overline{Q}to$ rises to gating level as will be described. This results in the generation of the signal $\overline{TR}2$. Since the signal $\overline{TR}2$ is coupled only to those gates in the tool offset circuits identifying the old dial switch, only those circuits are triggered and as a consequence the information relating to the old dial switch is parallel coupled into the overshoot counter in the presence of the carry/borrow inhibit signal. At this point the overshoot count register is no longer zero and the count register signal Cr which still exists results in the turning on of the transfer overshoot flip-flop 50 at such time as the signal OZ departs from gating level. At this point the transfer overshoot count begins and continues until completed at which time the transfer overshoot flip-flop 50 is again turned off. As will be described the signal $\overline{TR2}$ is a timed signal which times out after a predetermined interval of time, say of the order of 40 microseconds which is sufficient to permit the transfer of the information of the tool offset switches into the overshoot counter. The timing out of the signal $\overline{TR2}$ partially enables an initiation of the signal $\overline{TR1}$. Final enabling of the signal $\overline{TR1}$ occurs with the next turn on of the transfer overshoot flip-flop 50 when the old tool offset count in the overshoot count register has been counted down to zero. When the signal $\overline{TR1}$ is produced, the information signals relating to the new dial switch result in the transferring of the new tool offset information, with the sign reversed, into the overshoot count register at which time the dynamic count cycle begins, under the control of the clock pulses CLK, transferring the magnitude of the count of the new tool offset from the overshoot count register into the position count register. In connection with the transfer of the sign of the overshoot count, reference should be made to the connections marked +sign and −sign between the tool offset switches OSw and the overshoot sign flip-flop 102. The details whereby the selective reversal of sign is obtained will be explained in connection with the figures which follow herein.

TOOL OFFSET SEQUENCER

The details of the tool offset sequencer are illustrated in FIG. 14. See also the timing signal diagram FIG. 20. The sequence of development of the signals $\overline{TR2}$ and $\overline{TR1}$, together with the generation of the carry/borrow inhibit signal CBI, will be apparent from this circuit. The sequencer comprises a pair of transfer flip-flops FQt1 and FQt2 connected in cascade. The J input terminal of the flip-flop FQt1 is controlled by the signal Qt from the transfer flip-flop FQt. When the transfer flip-flop FQt is turned on by the tape signal t, this results in turning on of the first transfer flip-flop FQt1. The signal Qt1 of the first transfer flip-flop FQt1 is now at gating level. This signal is coupled as one input signal to an OR-gate OG1. The output of which is coupled inputwise to an inverter amplifier IAO. The output of this inverter amplifier is connected to the inhibit terminal of an inhibit gate IG3. In the absence of inputs to the OR-gate OG1, the output of the inverter amplifier IAO is high and acts as an inhibiting signal on the inhibit gate IG3 so that there can be no output. But with an input on the AND-gate OG1 the circuit is set to operate.

Operation begins at such time as the contents of the overshoot count register are counted down to zero, for example, during a period of dynamic transfer (clock pulse CLK) of the magnitude of the overshoot count with initiation of the operation of a new positioning movement (move signal M— count register signal Cr). At zero overshoot count the overshoot flip-flop 50 is turned off so that the signal $\overline{Q}to$ now moves to gating level. This signal as noted is coupled inputwise to an AND-gate AG1 the output of which triggers an amplifier circuit TRS, the output of which in turn is capacitor coupled inputwise to an inverter amplifier IA1. The output of the amplifier IA1 is coupled back to a second input terminal on the AND-gate AG1. When this circuit is not conducting the output of the amplifier IA1 is at gating level so that at such time as the transfer overshoot flip-flop signal $\overline{Q}to$ switches to gating level the AND-gate AG1 can produce an output. Triggering of the amplifier circuit TRS by this output of the AND gate results in disabling of the AND gate by the negative going output of the inverter amplifier IA1. The output of the one shot circuit TRS is marked TRS and is typically a positive going square wave signal having a duration of about 95 to 100 microseconds.

Since the inhibit gate IG3 is now enabled, as described above, the signal CBI, which is the carry/borrow inhibit signal, may be generated. To this end a one-shot circuit generally designated CBI is provided. This circuit is set to respond to the negative going excursion of the transfer signal TRS when this signal times out. Thus, the carry/borrow inhibit signal is generated about 95 microseconds after the transfer signal TRS is developed (see FIG. 20).

The transfer signal TRS is also coupled inputwise to the inhibit gates IG1 and IG2, respectively. Since the flip-flop FQt1 is the only one of the two transfer flip-flops which is presently turned on, only the signal $\overline{Q}t1$ is low. Thus, only the inhibit gate IG1 is enabled. The output of the inhibit gate IG1 is capacitor coupled into an inverter amplifier IA2 which in turn is coupled to an inverter amplifier IA3. The output signal which is used to trigger the K input terminal of the flip-flop FQt1 is an inverted square wave as depicted, that is, it normally exists in the higher of its two voltage states. This circuits is responsive to the negative-going excursion of the signal TRS which occurs roughly 95 microseconds after the signal is developed, and results in an inverted square wave of about 40 microseconds duration, for example, which is the signal $\overline{TR3}$. As noted hereinabove, the signal $\overline{TR2}$ is coupled to the tool offset enter circuit and results in the transfer of the information as to the old storage of position offset to the overshoot count register in the presence of the carry/borrow inhibit signal CBI which has been generated. With the application of the signal $\overline{TR2}$ to the K input terminal of the flip-flop FQt1 this flip-flop is turned off. The positive going excursion of the signal $\overline{Q}t1$ coupled to the J input terminal of the second transfer flip-flop FQt2 triggers this flip-flop so that it is turned on. The inhibiting signal $\overline{Q}t2$ on the inhibit gate IG2 now drops to the lower of its two voltage levels in which condition it no longer inhibits the gate. Thus, the gate is ready to pass a transfer signal TRS.

At the time of transfer of the dial switch count to the overshoot count register, the signal OZ drops from gating level. Since the signal Cr, which is the count register signal, still exists on the J input terminal of the transfer overshoot flip-flop 50, this flip-flop is now turned on. This introduces the pulse count delay in producing the pulses P' or N', as generally depicted here in FIG. 14 and as shown in greater detail in FIG. 4. As seen by reference to FIG. 6, the clock pulses are again generated with the result that in the absence of blanking pulses the overshoot count register is counted back down to zero, while the position count register is being counted up or down, depending upon the sign of the position or tool offset count that was in the old dial switch.

At zero count in the overshoot count register the transfer overshoot flip-flop is again turned off. At this point the AND-gate AG1 is again enabled and the transfer signal TRS is generated. Since the flip-flop FQt2 is now turned on, the inhibiting signal on the gate IG3 is removed so that the trailing edge of the signal TRS may once again fire the one-shot circuit CBI to generate the carry/borrow inhibit signal. Since the signal $\overline{Q}t2$ is now in the lower of its two voltage levels, the inhibit gate IG2 is enabled. The negative going trailing edge of the transfer signal TRS now also results in the production of the signal $\overline{TR1}$ which is operative, as described, to transfer the position offset information from the new dial switch to the overshoot count register where once again it is transferred to the position count register.

There is an additional control of the overshoot flip-flop 50 which is important at such time as there is a zero overshoot count or one of the position or tool offset dimensions is zero. When the overshoot count is zero, the overshoot count flip-flop 50 is held off by the DC reset signal OZ at its K input terminal. When an attempt is made to trigger it on at the J input terminal, signal Qto stays off (at −3 v.), but signal $\overline{Q}to$ momentarily becomes false for about 5 microseconds, and the signal TRS is generated and sustained for about 100 microseconds. This is the case when the overshoot flip-flop is triggered after the blanking pulse is over. The 100 microsecond signal provides sufficient time. If no overshoot or tool offset is to be transferred, the signal TRS goes off and the next step in the transfer cycle is started. If, on the other hand, the overshoot count register contains a number, the transfer overshoot flip-flop stays on and so does the signal TRS.

The control of the overshoot flip-flop by the blanking pulse signal B is shown at OR-gate OG3. Another control of the OR-gate OG3 is provided by the transfer signal $\overline{TRA}$. Signal $\overline{TRA}$ is produced by the carry/borrow inhibit signal via inhibit gate IG3. The negative going excursion of the signal $\overline{CBI}$ triggers the one shot circuit TRA to produce signal $\overline{TRA}$ to momentarily trigger the transfer overshoot flip-flop 50 to produce the negative going excursion of signal $\overline{Q}to$. This will be explained herebelow during the discussion of operation in connection with FIG. 17.

TOOL OFFSET STORAGE CIRCUITS

FIG. 17 illustrates the tool offset storage circuits illustrating certain of their details, together with the interconnection of the two circuits. These memory circuits comprise individual memory elements. Those in the tool offset storage circuit No. 1 comprise memory elements M11, M12 and M13. The memory elements in the tool offset storage circuit No. 2 are designated M21, M22 and M23. These individual memory elements are actually unclamped flip-flops and, as such, each have two stable states. A memory element consists of two inverters, the output of one being connected to the input of the other. This connection may not always be direct and may be made through control gates. The inverters are typically inverter amplifiers and are designated IA8 and IA9 in storage offset circuit No. 1 and IA11 and IA12 in the storage offset circuit No. 2. Each inverter may comprise an NPN type of transistor in which the emitters are grounded. Thus, when the transistor is conducting its collector voltage approaches ground potential and when a transistor is not conducting its collector voltage will be at some lower voltage. The inverter amplifiers IA8 and IA9 are interconnected by an OR-gate OG5 and the inverter amplifiers IA11 and IA12 are interconnected by an OR-gate OG7. A reset signal RS1 is coupled as a remaining input terminal to the OR-gate OG5 and a reset signal RS2 is coupled as a remaining input connection to the OR-gate OG7. While these reset signals are shown only connected into the OR gate at the uppermost of the memory elements, it is to be understood the reset signals are coupled in the same manner to each of the remaining memory elements in each of the two storage circuits. When these memory circuits are reset, the output amplifier is cut off so that its output voltage is at the lower of its two potentials. A latching circuit which feeds back to the input of the input amplifier therefore drops the potential so that the input amplifier becomes conducting. Thus, in reset condition, for example, with respect to the memory element M11, the signal S1A would be at the lower of its two voltage potentials, that is, false, and the signal $\overline{S1A}$ would be at the higher of its two voltage potentials which would be the true state. This indicates that no information is recorded in the memory element or, stated otherwise, when considered in binary relationship with the other elements in each of the storage elements, a binary zero is recorded. The reset signal RS2 for the tool offset storage circuit No. 2 is generated by the move flip-flop. By reference to FIG. 5 it will be seen that this flip-flop is turned off when movement in the axis is complete as represented by a zero count in the overshoot count register, a zero count in the position count register, and the absence of a transfer overshoot signal indicating that the transfer overshoot flip-flop has been turned off. The reset signal RS1 for the tool offset storage circuit No. 1 is generated when the transfer flip-flop FQ$t$ is turned on. At this time the signal $\overline{Q}t$ swings in a negative direction. This negative-going signal is capacitor coupled inputwise to the inverter amplifier IA7 and the resulting positive-going excursion of the reset signal RS1, coupled via the OR-gate OG5 to the transistor of the amplifier IA9 will cut off this transistor if it had been conducting. Each memory element is controlled by the output of the transfer flip-flop $\overline{Q}t$, by a signal $\overline{QD2}$, which identifies the particular role of the type which is being read, and by one of the information signals, here indicated as the $\overline{E}$ signals, which come from particular columns of the type. In this instance it will be noted that three $\overline{E}$ signals are denoted. These signals together in binary code identify a particular one of the position or tool offset switches which is to be selected. Reference is here again made to the timing signal diagram of FIG. 16, showing the relationships of these three signals. As will be seen by this timing diagram, the transfer signal $\overline{Q}t$ and the information signal $\overline{E}$ exist prior to the time of the positive-going excursion of the tape row signal $\overline{QD2}$.

Thus, the timing provides for reading of the tape information signal. If an information signal exists, the positive-going excursion of the signal $\overline{QD2}$ results in cutting off of the amplifier IA8. The negative-going excursion of the output signal of the amplifier IA8 now results in conduction of the amplifier IA9 so that its output rises towards zero volts which is its true, or 1, representing electrical state.

Assuming that a machine operation is about to be begun, and that the count registers and the tool offset storage circuits are all reset, as the tape is read, the desired position is set into the position count register. The position or tool offset has previously been set by the attendant into that particular tool offset switch known to be identified on the tape by the information signal $\overline{E}$. Thus, as the tape is read, the information, with respect to the position or tool offset switch, is also set into the tool offset storage circuit No. 1. Since in this situation there is no overshoot count stored in the overshoot count register, the transfer overshoot flip-flop will be off. It is held off by the DC reset signal $OZ$ at the $K$ input terminal. When tape reading is completed and the move command signal $m$ occurs, a brief time delay later the count register flip flop 74, as seen in FIG. 5, is turned on, producing the signal $Cr$. This signal, coupled to the $J$ input terminal of the transfer overshoot flip-flop 50, as seen in FIG. 14, results in momentary partial switching of this flip-flop. The signal Q$to$ does not change. The signal $\overline{Q}to$ swings negative for about 5 microseconds. Any negative-going signal is gated by the AND-gate AG1 and the signal TRS is generated and sustained for about 95 microseconds. This produces the signal $\overline{TR2}$ which normally transfers the setting of the tool offset storage circuit No. 2 to the overshoot count register. However, in this instance, the setting of the storage circuit No. 2 is zero. Thus, the count of the overshoot count register is zero and the overshoot flip-flop 50 remains off. At the end of the timing interval for the carry/borrow/inhibit signal CBI, this signal goes negative. The negative-going excursion of this signal is gated by the gate IG4 in FIG. 14. The test signal thereon at this time being below the inhibiting level, which results in triggering of the one-shot circuit TRA, producing the signal $\overline{TRA}$, which, like the signal CR, tries to switch the overshoot flip-flop 50 to its true electrical state. Since the overshoot count register is at zero count, this again results in a momentary negative-going excursion of the signal $\overline{Q}to$ which initiates another cycle of the signal TRS. Thus the signal $\overline{TR1}$ is generated, which results in the transfer of the new position or tool offset information in the switch identified by the tool offset storage circuit NO. 1 from the switch to the overshoot count register but with the sign reversed, as will be explained. At this point, the transfer overshoot flip-flop 50 switches to its true electrical state and the dynamic transfer previously described takes place so that the magnitude of the count of the overshoot count register is effectively combined with the count indicative of the desired position in the position count register. At the end of this positioning movement, the move flip-flop is turned off and the negative-going excursion of the signal m coupled to the input of the AND-gate OG6 in the tool offset storage circuit No. 2 couples a reset signal in each of the memory elements M21, M22 and M23 to reset the circuits.

When a new block of tape is read, the signal $t$ operating the transfer flip-flop FQ$t$ results in the signal RS1 which resets the memory elements of the tool offset storage circuit No. 1. If any of the memory elements M11, M12 and M13 have been set to their 1 representing electrical states, resetting of these memory elements results in a positive-going excursion on that output circuit $\overline{S}1A$, $\overline{S}1B$, or $\overline{S}1C$ associated therewith, which correspondingly sets that memory element to which each such circuit is coupled in the tool offset storage circuit No. 2. Thus, resetting of the memory elements of tool offset storage circuit No. 1 is instrumental in correspondingly setting the memory elements of the tool offset storage circuit No. 2. Thus the preceding storage now becomes the old storage with respect to the tool offset switch which is identified. Thus, by reference to FIG. 16 it will be seen that after the occurrence of the negative-going excursion of the signal $\overline{Q}t$ that reading of the information signals $\overline{E}$ for the new tool offset switch, which is identified, takes place and is set into the tool offset storage N0. 1. Thus, both tool offset storage circuits contain information identifying a particular switch; the new switch being identified in tool offset storage circuit No. 1 and the old switch being identified in tool offset storage circuit No. 2. The generation of the transfer signals $\overline{TR}2$ and $\overline{TR}1$ transfer the stored information in the manner previously described. In accordance with the sequence of the signals $\overline{TR}2$ and $\overline{TR}1$, such transfer taking place after the transfer of any overshoot count which may have existed in the overshoot counter from the preceding positioning movement.

TOOL OFFSET ENTER CIRCUITS

The tool offset enter circuits illustrated in FIG. 18 are adapted to handle signals for identifying four tool offset switches for both old and new storage. The switch-identifying signals are identified SW1, SW2, SW3 and SW4 and may be either for the old or new tool offset switches. The switch that is selected, and whether or not it is a switch which contains new tool offset information or old tool offset information, depends upon the particular one of those OR gates identified OG8, which is enabled. There are eight OR gates altogether. Four of these OR gates have coupled thereto the S1 and $\overline{S}1$ signals. These signals, it will be noted, are derived from the outputs of the memory circuits of the tool offset storage circuit No. 1, which contains the information relating to the magnitude of the new tool offset. The four remaining OR gates include the signals S2 and $\overline{S}2$, which it will be seen are derived from the tool offset storage circuit No. 2. All of these OR gates effectively function as AND gates in that all of the input signals identified by the letter S or $\overline{S}$ must be in the lower of their two voltage states for the gates to be enabled. When in this state, any gate receiving a signal $\overline{TR}1$ or a signal $\overline{TR}2$ will result in operation of the connected amplifier IA13. These amplifiers are operated by the positive-going excursion of the respective signal $\overline{TR}1$ or $\overline{TR}2$. Thus, if in tool offset storage circuit No. 2 the memory elements M21 and M22 had been set in their one (1) REPRESENTING ELECTRICAL STATES, REPRESENTING THE DECIMAL NUMBER 3, the output configuration of the electrical signals would be represented by the signals $\overline{S}2A$, $\overline{S}2B$ and S2C, all of which are in their lower electrical state. The lower left-hand OR gate in FIG. 18 contains this signal configuration. Thus, with the next positive-going excursion of the signal $\overline{TR}2$, the amplifier connected thereto will produce an output signal in the circuit S23 which is also diode coupled to the circuit marked SW3. Similar considerations apply with respect to the new storage.

TOOL OFFSET SWITCHES

In FIG. 19 the tool offset switches are illustrated schematically. For the purposes of this discussion, these switches may be assumed to be manually set. There are four switches, each with three binary coded decimal decades and one section for indicating the sign. In utilizing a particular tape, the attendant knows which switches are identified in each block of information for the offset for a particular tool. In view of this, as each new block of information comes up, the attendant is able to set the corresponding switch to that decimal position to provide the desired tool offset and to indicate the direction of the offset with respect to the direction of positioning movement in the axis by setting that section of the switch which is designated sign. As will be seen, the sign section of each of these switches is connected to the JK input terminals of the sign flip-flop 102, which it will be recalled is also controlled by the overshoot sign logic illustrated in FIG. 11. Each switch comprises two sign sections. These, it will be noted, are coupled in reverse to the JK input circuits which are also individually diode isolated. Thus, when a new tool offset is being selected, the sign reversal is automatically achieved in the selection of one of the circuits S11, S12, S13 or S14 for the particular switch SW1, SW2, SW3 or SW4 which is selected. When information with respect to an old tool is to be transferred, then the associated circuit S21, S22, S23 or S24 for the switch which is selected is energized.

FIG. 19 also illustrates the connections of the individual decades of the different switches with the corresponding decades of the overshoot count register 14, together with the introduction of the carry/borrow/inhibit signal in parallel to the different decades. Thus, the parallel introduction of the tool offset information signals into the differing decades of the counter in the presence of the carry/borrow/inhibit signal is set out.

TIMING SIGNALS

Reference has been made throughout this descriptive disclosure to the individual signals which are identified in FIG. 20. The reference character identifying each of the signals is in the left-hand column adjacent the signal. At any point of interest herein where a signal changes electrical state, that signal which is responsible for the change of the electrical state is listed. Thus, using the signal $\overline{Q}to$ as an example, it will be seen that the first negative-going excursion is caused by a signal CR. This, it will be recalled, is the signal produced by the count register flip flop 74 of FIG. 5 at the time it is turned on. The next two negative-going excursions of this signal are caused by the combination of the signal $\overline{TR}A$ and B as described in discussing the operation of the tool offset storage circuits of FIG. 17 which resulted in part in a functional description of the operation of the tool offset sequence of FIG. 14.

What is claimed is:

1. In a system for controlling the position of a movable element, a position offset control comprising:
    a position count register for storing a count indicative of a present desired position;
    a counter for receiving a count indicative of a correction to be made to said count indicative of a desired position;
    at least two position offset switches presettable to indicate a position offset correction and coupled to said counter, one switch being set for a position offset correction for a preceding desired position and the other switch being set to a position offset correction for the present desired position;
    means including a movement sensing transducer system for producing pulses for incrementally changing the count of said position count register in response to movement of said movable element;
    drive means responsive to said position count register for controlling the movement of said movable element;
    selection circuit means responsive to said counter for sequentially selecting said switches for transferring said indications of position offset corrections to said counter; and
    circuit means coupled to said position count register and said counter for algebraically combining the magnitude of the count of said counter with the count indicative of present desired position after each transfer of said indications of position offset correction to said counter.

2. The apparatus of claim 1 wherein said selection circuit means comprises:
    position offset circuit means for identifying said position offset switches;

a tool enter circuit for coupling said position offset circuit means to said position offset switches; and a sequencer circuit coupled to said tool enter circuit and producing sequential signals for sequentially interrogating said switches.

3. The apparatus of claim 2 wherein said position offset circuit means comprises:

a first storage circuit and a second storage circuit coupled to and controlled by said first storage circuit;

means coupling both of said storage circuits to said tool enter circuit for controlling said tool enter circuit; and means for coupling switch selection information to said first storage circuit.

4. The apparatus of claim 1 having first sign means for indicating the sign of said count indicative of a present desired position for controlling the direction of counting of said position count register;

second sign means for indicating the sign of the count in said counter;

third sign means for indicating the sign of the position offset correction in each of said position offset switches;

said circuit means being responsive to said first sign means and said second sign means for algebraically combining the count of said counter, with its sign reversed, with said count indicative of present desired position after each transfer of said indications of position offset to said counter; and means controlled by said third sign means and coupled to said second sign means for setting said second sign means to indicate the sign of said preceding position offset correction during transfer of said preceding position offset correction and, for setting said second sign means to indicate the reverse of the sign of said present position offset correction during transfer of said present position offset correction.

* * * * *